US010445038B2

(12) United States Patent
Nakao

(10) Patent No.: US 10,445,038 B2
(45) Date of Patent: Oct. 15, 2019

(54) IMAGE FORMING APPARATUS, IMAGE FORMING SYSTEM, AND PORTABLE COMMUNICATION DEVICE

(71) Applicant: KYOCERA Document Solutions Inc., Osaka (JP)

(72) Inventor: Yukihiro Nakao, Osaka (JP)

(73) Assignee: KYOCERA Document Solutions Inc., Osaka (JP)

(*) Notice: Subject to any disclaimer, the term of this patent is extended or adjusted under 35 U.S.C. 154(b) by 0 days.

(21) Appl. No.: 16/122,499

(22) Filed: Sep. 5, 2018

(65) Prior Publication Data

US 2019/0073169 A1 Mar. 7, 2019

(30) Foreign Application Priority Data

Sep. 7, 2017 (JP) .................. 2017-171785
Nov. 27, 2017 (JP) .................. 2017-226651

(51) Int. Cl.
*G06F 3/12* (2006.01)
*H04N 1/00* (2006.01)

(52) U.S. Cl.
CPC ......... *G06F 3/1237* (2013.01); *G06F 3/1205* (2013.01); *G06F 3/1258* (2013.01); *G06F 3/1292* (2013.01); *H04N 1/00177* (2013.01)

(58) Field of Classification Search
CPC ...................................... G06F 3/1237
USPC ...................................... 358/1.15
See application file for complete search history.

(56) References Cited

U.S. PATENT DOCUMENTS

2015/0138597 A1* 5/2015 Koshigaya ......... H04N 1/00973
358/1.15
2015/0181050 A1* 6/2015 Nishii ............... H04N 1/00307
358/1.15

FOREIGN PATENT DOCUMENTS

JP 2015-99565 A 5/2015

* cited by examiner

*Primary Examiner* — Jacky X Zheng
(74) *Attorney, Agent, or Firm* — Stein IP, LLC

(57) ABSTRACT

An image forming apparatus includes a communication unit, a storage unit, and a control unit. The storage unit stores setting information including set value data and route data. When communication with a portable communication device has been enabled, the communication unit acquires present route information from the portable communication device. Upon acquiring the present route information, the control unit extracts a piece of setting information in which the route data is identical to the present route information thus acquired. Set values defined by the set value data included in the extracted piece of setting information are reproduced.

18 Claims, 13 Drawing Sheets

IMAGE FORMING APPARATUS, IMAGE FORMING SYSTEM, AND PORTABLE COMMUNICATION DEVICE

This application is based upon and claims the benefit of priority from the corresponding Japanese Patent Application No. 2017-171785 filed on Sep. 7, 2017 and the corresponding Japanese Patent Application No. 2017-226651 filed on Nov. 27, 2017, the entire contents of which are incorporated herein by reference.

BACKGROUND

The present disclosure relates to an image forming apparatus. Furthermore, the present disclosure relates to an image forming system including the image forming apparatus and a portable communication device. Furthermore, the present disclosure relates to the portable communication device.

Portable terminals have been in widespread use. Examples of portable terminals include a mobile phone. Portable terminals may be configured so as to be able to make settings with respect to an image forming apparatus. There is known a technique for making settings with respect to an image forming apparatus by using a portable terminal as follows.

Specifically, a portable terminal has been described that performs non-contact wireless communication, sets setting information on functions to be executed by a subject apparatus, stores the setting information thus set, and transmits the setting information thus stored to the subject apparatus by the non-contact wireless communication. This type of portable terminal is intended to be brought close to a subject apparatus so that settings with respect to a desired apparatus can be made.

Recent years have seen further advancement in functionality of image forming apparatuses. Various types of setting items are prepared for an image forming apparatus. A user makes a selection from among such setting items so that a desired result can be obtained. The user sets a set value of the setting item thus selected so that the desired result can be obtained. For example, when wishing to obtain double-sided printed matter, the user selects the setting item for double-sided printing. Then, the user sets such a set value as to enable double-sided printing.

A set value a user wishes to set varies depending on a time and circumstances. A set value used in executing a job is not necessarily always the same. There may be a case where setting information registered in a portable terminal fails to provide a desired result.

SUMMARY

An image forming apparatus according to the present disclosure includes a communication unit, a storage unit, and a control unit. The communication unit communicates with a portable communication device. The storage unit stores present set value information and setting information. The control unit performs control so that a job is performed based on the present set value information. The present set value information is data indicating a set value of each setting item presently set for a job about to be executed. The setting information includes set value data and route data. The set value data indicates a set value of each setting item for a job that has been executed. The route data indicates a movement route taken, when a job corresponding to the set value data is executed, by the portable communication device until communication with the communication unit is enabled. When communication with the portable communication device has been enabled, the communication unit acquires present route information from the portable communication device. The present route information indicates a movement route taken this time by a carrying user carrying the portable communication device until communication with the image forming apparatus is enabled. When the communication unit has acquired the present route information, the control unit extracts, from the setting information stored in the storage unit, a piece of the setting information in which the route data is identical to the present route information thus acquired. The control unit controls the storage unit to update the present set value information so as to reproduce the set value defined by the set value data included in the piece of the setting information thus extracted.

Furthermore, an image forming system according to the present disclosure includes a portable communication device and an image forming apparatus. The portable communication device stores setting information and movement history data indicating a history of movement of a carrying user carrying the portable communication device. The setting information is data that is a combination of route data and set value data. The route data indicates a movement route taken, when the carrying user executes a job on the image forming apparatus, by the carrying user until arrival at the image forming apparatus. The set value data indicates a set value of each setting item for a job. The portable communication device wirelessly communicates with the image forming apparatus. When the carrying user has approached the image forming apparatus and thus the portable communication device has entered a communicable area where communication with the image forming apparatus is enabled, based on the movement history data, the portable communication device checks present route information indicating a movement route taken by the carrying user until communication with the image forming apparatus is enabled. The portable communication device extracts, from the setting information stored therein, a piece of the setting information in which the route data is identical to the present route information. The portable communication device transmits, to the image forming apparatus, the set value data included in the piece of the setting information thus extracted. The portable communication device causes the image forming apparatus to set the set value of the each setting item based on the set value data thus transmitted.

Moreover, an portable communication device according to the present disclosure includes an information storage unit, a wireless communication unit, and a processing unit. The information storage unit stores setting information and movement history data indicating a history of movement of a carrying user carrying a portable communication device. The wireless communication unit wirelessly communicates with an image forming apparatus. The setting information is data that is a combination of route data and set value data. The route data indicates a movement route taken, when the carrying user executes a job on the image forming apparatus, by the carrying user until arrival at the image forming apparatus. The set value data indicates a set value of each setting item used in a job. When the carrying user has approached the image forming apparatus and thus the processing unit has entered a communicable area where communication with the image forming apparatus is enabled, based on the movement history data, the processing unit checks present route information indicating a movement route taken by the carrying user until entry into the communicable area. The processing unit extracts, from the setting information stored, a piece of the setting information in which the route data is identical to the present route information. The processing unit causes the wireless communication unit to transmit, to the image forming apparatus, the set value data included in the piece of the setting information thus extracted. The processing unit causes the image forming apparatus to set the set value of the each setting item based on the set value data.

Further features and advantages of the present disclosure will become more apparent from the description of embodiments given below.

DETAILED DESCRIPTION

In the present disclosure, in accordance with a behavior (movement) pattern of a carrying user carrying a portable communication device 2, a set value related to a job is automatically set so that a result desired by the carrying user can be obtained. In this configuration, at a point in time when the carrying user arrives at an image forming apparatus 1, the set value has already been set.

With reference to FIG. 1 to FIG. 12, the following describes the image forming apparatus 1 and an image forming system 100 according to an embodiment of the present disclosure. It is to be noted, however, that various elements such as configurations and arrangements described in this embodiment are merely illustrative examples and not intended to limit the scope of the disclosure.

(Image Forming System 100)

Figure 1:
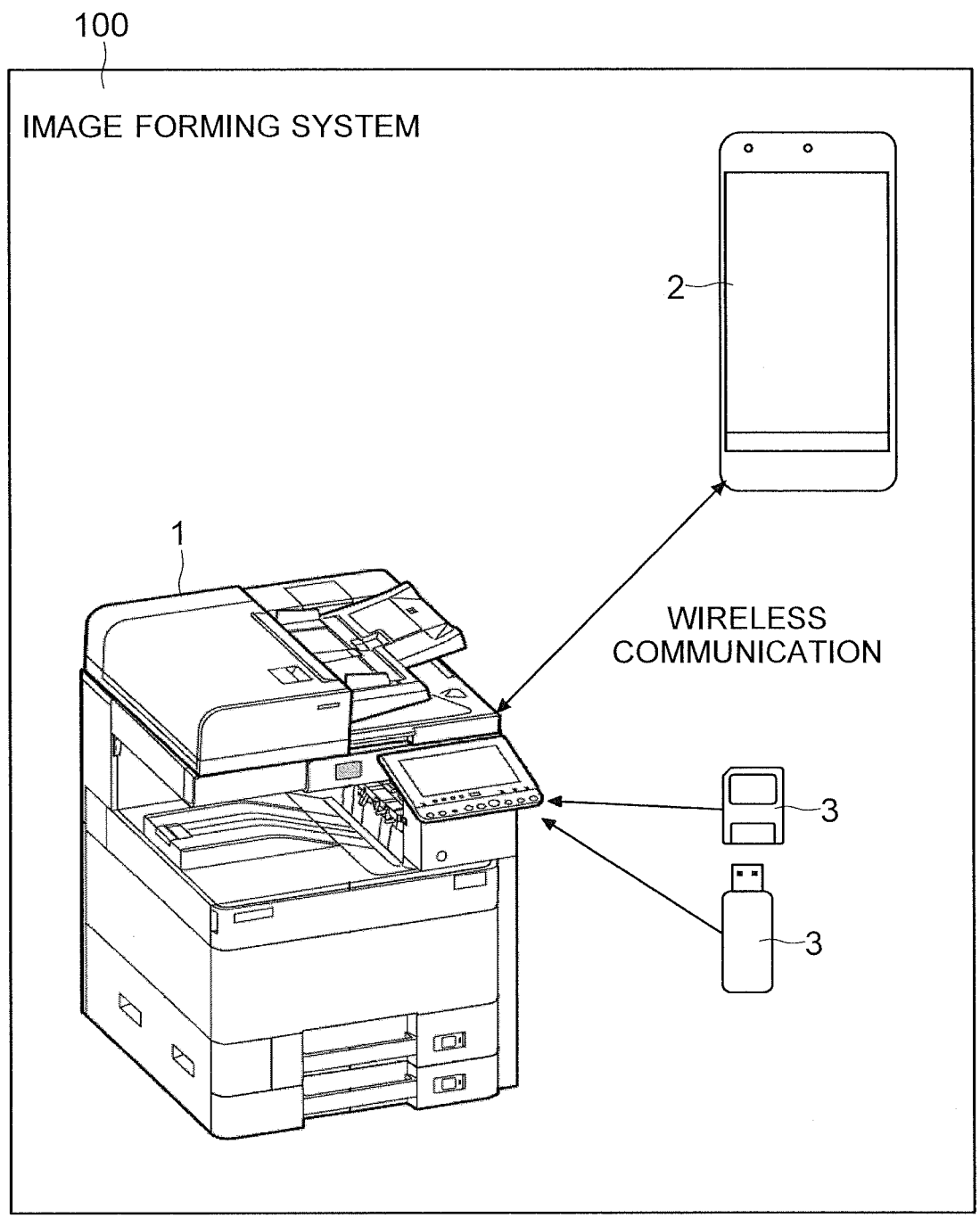
FIG. 1 is a view showing one example of an image forming system according to an embodiment and a modification example.

With reference to FIG. 1, a description is given of one example of the image forming system 100 according to the embodiment. As shown in FIG. 1, the image forming system 100 includes the image forming apparatus 1 and the portable communication device 2. The following describes an example in which the image forming apparatus 1 is a multi-functional peripheral. The image forming apparatus 1 may be a printer or a copy machine. Furthermore, in the following description, a person who moves while holding the portable communication device 2 is referred to as a "carrying user".

There are a plurality of types of jobs executable in the image forming apparatus 1. For example, a copy job, a scan storage job, a scan transmission job, and a memory connection printing job can be performed. The copy job is a job in which printing is performed based on image data obtained through reading of an original document. The copy job is a job for obtaining a duplicate of an original document. The scan storage job is a job in which image data obtained through reading of an original document is stored in a storage 11c in the image forming apparatus 1. The scan transmission job is a job in which image data obtained through reading of an original document is transmitted to a set destination. The memory connection printing job is a job in which data is read out from a portable memory 3 connected to the image forming apparatus 1 and printing is performed based on the data thus read out. The portable memory 3 is, for example, a USB memory or a memory card.

The portable communication device 2 is carried (held) by a user. The portable communication device 2 moves together with the user. The portable communication device 2 shown in FIG. 1 is a smartphone. The following describes an example in which a smartphone is used as the portable communication device 2. The portable communication device 2 is not limited to a smartphone. The portable communication device 2 may be a tablet-type computer, a notebook computer, or a head-mounted display. Any device that is carried and has a function of communicating with another communication device can be used as the portable communication device 2.

(Image Forming Apparatus 1)

Figure 2:
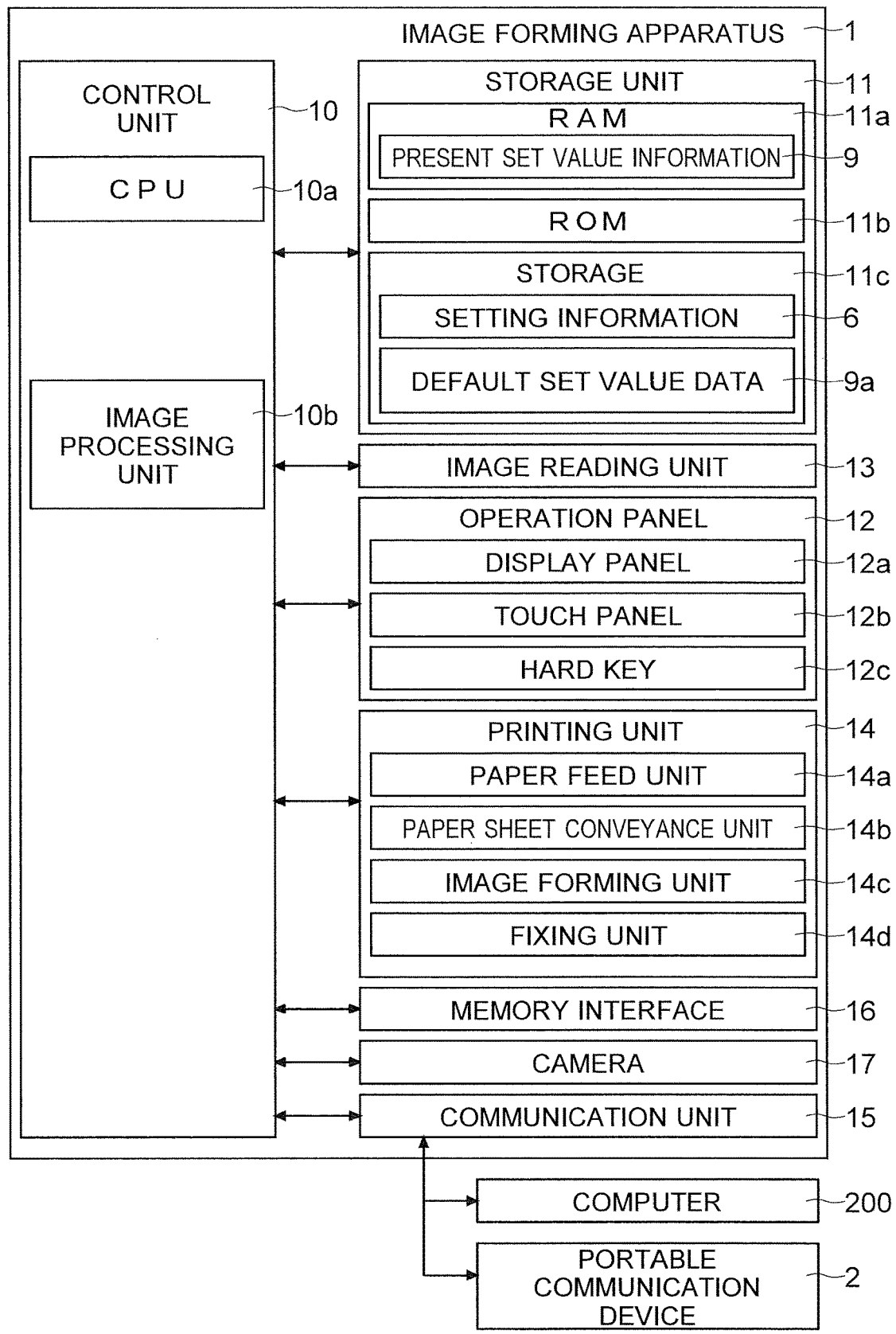
FIG. 2 is a view showing one example of an image forming apparatus according to the embodiment and the modification example.

With reference to FIG. 2, a description is given of one example of the image forming apparatus 1 according to the embodiment. As shown in FIG. 2, the image forming apparatus 1 includes a control unit 10, a storage unit 11, an operation panel 12, an image reading unit 13, a printing unit 14, a communication unit 15, a memory interface 16, and a camera 17.

The control unit 10 controls an operation of the image forming apparatus 1. The control unit 10 includes a CPU 10a and an image processing unit 10b. The storage unit 11 includes a RAM 11a, a ROM 11b, and a storage 11c. The storage 11c is a large-capacity non-volatile storage device.

For example, the storage 11c is an HDD or an SSD. The storage unit 11 stores data, settings, and programs for controlling the image forming apparatus 1. Based on the programs and data stored in the storage unit 11, the CPU 10a controls the image forming apparatus 1. The image processing unit 10b includes a circuit that processes image data. The image processing unit 10b processes image data and generates image data to be used for a job.

In a job involving reading of an original document (the copy job, the scan storage job, the scan transmission job), the control unit 10 controls the image reading unit 13 to read the original document. The image reading unit 13 generates image data of the original document.

The operation panel 12 accepts a setting operation by a user. The operation panel 12 includes a display panel 12a, a touch panel 12b, and a hard key 12c. The display panel 12a is a liquid crystal panel or an organic EL panel. The control unit 10 controls the display panel 12a to display a setting screen and an operation image. The operation image is, for example, a button, a soft key, or a tab. The user operates (touches) the operation image displayed on the display panel 12a. This allows the user to input various types of settings with respect to the image forming apparatus 1.

The touch panel 12b is provided on an upper surface of the display panel 12a. The touch panel 12b detects a position and coordinates touched by the user. The touch panel 12b accepts an operation performed by the user. An output of the touch panel 12b is inputted to the control unit 10. The control unit 10 recognizes the touch position touched by the user. Based on an output of the touch panel 12b, the control unit 10 recognizes a type of the operation image operated by the user. The control unit 10 recognizes a setting operation performed by the user. Based on a setting made by the user, the control unit 10 controls the image reading unit 13, the printing unit 14, and the communication unit 15 to operate (to perform a job). For example, the hard key 12c is a numeric keypad or a start key. The numeric keypad is a group of keys for inputting numerals. The start key is a key for issuing a job start instruction. The hard key 12c also accepts an operation performed by the user.

The operation panel 12 accepts a selection of a job type. On the operation panel 12, the user can select a type of a job to be executed. Examples of the job type that can be selected include the copy job, the scan transmission job, the scan storage job, and the memory connection printing job. With respect to each of such job types, a plurality of setting items are provided. For example, regarding the copy job, setting items such as a size of a paper sheet to be used for printing and a magnification for enlargement/reduction are provided. The operation panel 12 accepts a selection from among such setting items.

The operation panel 12 also accepts a setting of a set value of a setting item thus selected. For example, as for a setting item of a paper sheet size, a paper sheet size to be used can be set as a set value (for example, a letter size). As for a setting item of enlargement/reduction, a magnification can be set as a set value. In the scan transmission job or the scan storage job, a transmission destination (a storage destination) of image data of an original document needs to be set as a set value.

The printing unit 14 includes, for example, a paper feed unit 14a, a paper sheet conveyance unit 14b, an image forming unit 14c, and a fixing unit 14d. In a job involving printing, the control unit 10 controls the printing unit 14 to execute printing based on image data. The control unit 10 controls the paper feed unit 14a to feed a paper sheet. The control unit 10 controls the paper sheet conveyance unit 14b to convey the paper sheet. The control unit 10 controls the image forming unit 14c to form a toner image. The control unit 10 controls the image forming unit 14c to transfer the toner image thus formed onto the paper sheet. The control unit 10 controls the fixing unit 14d to fix the toner image on the paper sheet.

The communication unit 15 is communicable with a computer 200 via a network. The communication unit 15 receives printing data transmitted from the computer 200. Based on the printing data thus received, the control unit 10 controls the printing unit 14 to perform printing. Furthermore, the communication unit 15 is communicable with a wireless communication unit 28 of the portable communication device 2 by short-range wireless communication. For example, based on Wi-Fi standards, the communication unit 15 is communicable with the wireless communication unit 28. Furthermore, based on Bluetooth standards, the communication unit 15 may communicate with the wireless communication unit 28. The communication unit 15 is provided with hardware (a communication circuit) and communication software for performing communication based on standards.

The memory interface 16 is a portion that connects the portable memory 3 to the image forming apparatus 1. The memory interface 16 includes a socket, a terminal, a communication circuit, and communication software for communicating with the portable memory 3. The control unit 10 can read out data from the portable memory 3 connected to the memory interface 16. The control unit 10 controls the printing unit 14 to perform printing based on the data thus read out (the memory connection printing job).

The image forming apparatus 1 includes the camera 17. As the camera 17, one or a plurality of cameras may be used. The control unit 10 controls the camera 17 to photograph a carrying user approaching the image forming apparatus 1. The camera 17 includes a lens, an image sensor, and a photographing data generation circuit. The lens is oriented in a direction of photographing the carrying user approaching the image forming apparatus 1.

The image sensor includes a plurality of light-receiving elements that are two-dimensionally arranged. Each of the light-receiving elements of the image sensor outputs an analog signal (electric charge) having a magnitude corresponding to an amount of light received. For example, the image sensor outputs an analog signal of each of color components of R, G, and B. The photographing data generation circuit processes the analog signal outputted from the image sensor. The photographing data generation circuit performs A/D conversion with respect to the analog signal after being processed. The photographing data generation circuit outputs photographing data (digital data). The photographing data is stored in the storage unit 11.

(Portable Communication Device 2)

Figure 3:
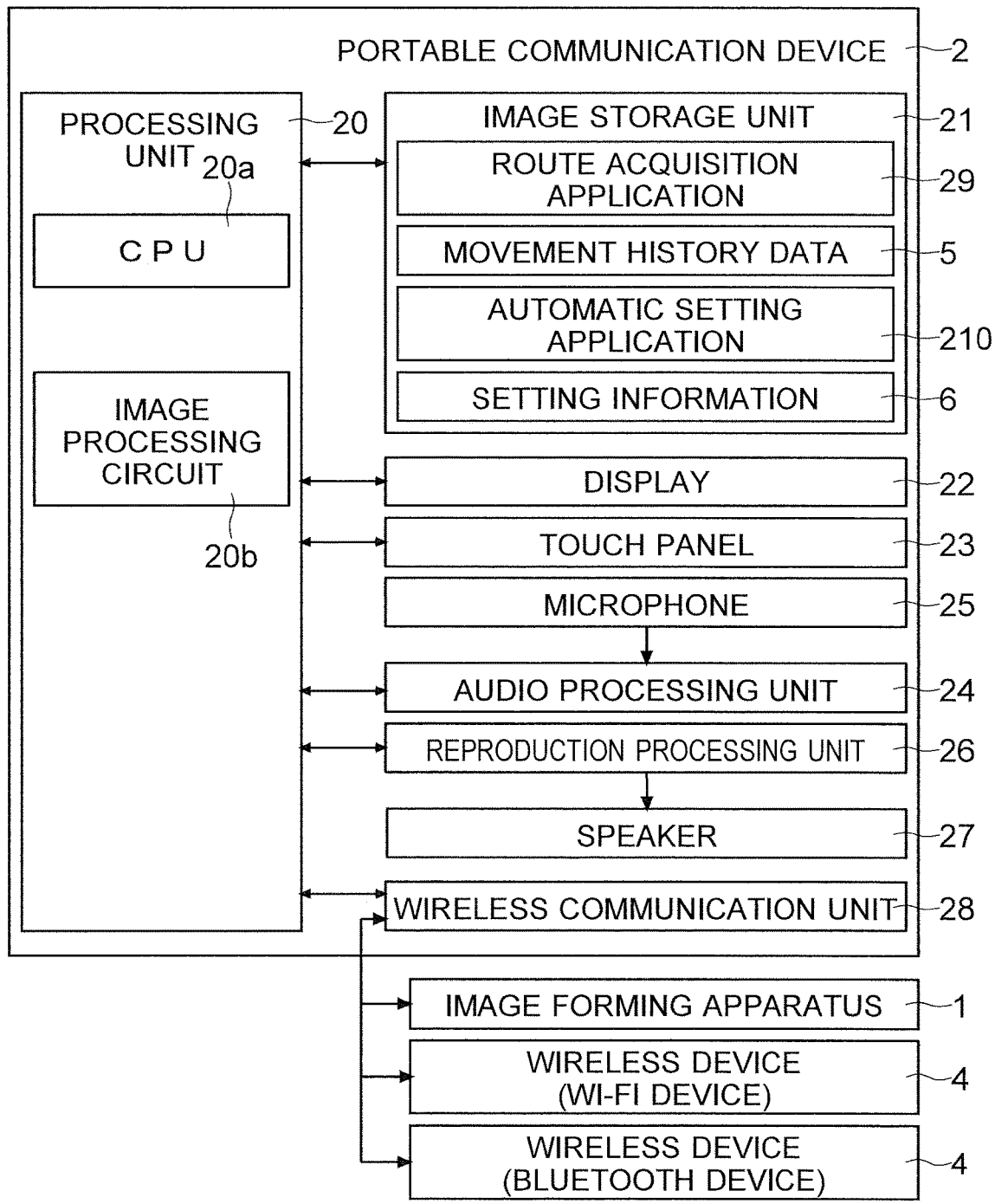
FIG. 3 is a view showing one example of a portable communication device according to the embodiment and the modification example.

Next, with reference to FIG. 3, a description is given of one example of the portable communication device 2 according to the embodiment. The portable communication device 2 includes a processing unit 20, an information storage unit 21, a display 22, a touch panel 23, an audio processing unit 24, a microphone 25, a reproduction processing unit 26, a speaker 27, and a wireless communication unit 28.

The processing unit 20 is a circuit that controls an operation of the portable communication device 2. The processing unit 20 includes a CPU 20a and an image processing circuit 20b. Based on an OS, a program, an application, and data, the processing unit 20 controls the operation of the portable communication device 2. The image processing circuit 20b performs image processing on image data.

The information storage unit 21 includes a ROM, a RAM, and a flash memory. The information storage unit 21 stores an OS, a program, an application, and data in a non-volatile manner. In accordance with contents stored in the information storage unit 21, the processing unit 20 controls the various portions of the portable communication device 2. In accordance with a user's request to start the application made through the touch panel 23, the processing unit 20 reads out the application from the information storage unit 21 and executes the application.

As the application, a route acquisition application 29 is installed in the information storage unit 21. The information storage unit 21 stores the route acquisition application 29 in a non-volatile manner. The route acquisition application 29 is an application for automatically transmitting present route information to the image forming apparatus 1 when a carrying user has approached the image forming apparatus 1 (this will be detailed later).

In accordance with a request from the processing unit 20, the display 22 displays various types of information. The display 22 is a display panel such as a liquid crystal panel or an organic EL panel. The display 22 displays an operation image. The operation image is, for example, an icon, a button, a key, or a tab. The touch panel 23 is connected to the processing unit 20. Based on an output of the touch panel 23, the processing unit 20 recognizes a touch position. The processing unit 20 recognizes a type of the operation image operated (touched). By pressing the icon, the button, or the key, the user can start and use the application. The audio processing unit 24 performs signal processing in which an audio inputted from the microphone 25 is converted into a form of data that can be transmitted from the wireless communication unit 28. The reproduction processing unit 26 causes the speaker 27 to reproduce data of a sound (a voice) from a communication partner received by the wireless communication unit 28.

The wireless communication unit 28 includes a circuit and software for performing the short-range wireless communication. In accordance with an instruction from the processing unit 20, the wireless communication unit 28 communicates with a wireless device 4 within a communicable distance. The wireless communication unit 28 (the portable communication device 2) is communicable also with the image forming apparatus 1 by the short-range wireless communication. For example, the wireless communication unit 28 is capable of communication based on IEEE 802.11 series (Wi-Fi) standards. Furthermore, the wireless communication unit 28 is also capable of communication based on the Bluetooth standards. The wireless communication unit 28 is provided with hardware (a communication circuit) and communication software for performing communication based on communication standards. The wireless communication unit 28 may be capable of communication based on other communication standards.

(Determination of Article Held by Carrying User)

Figure 4:
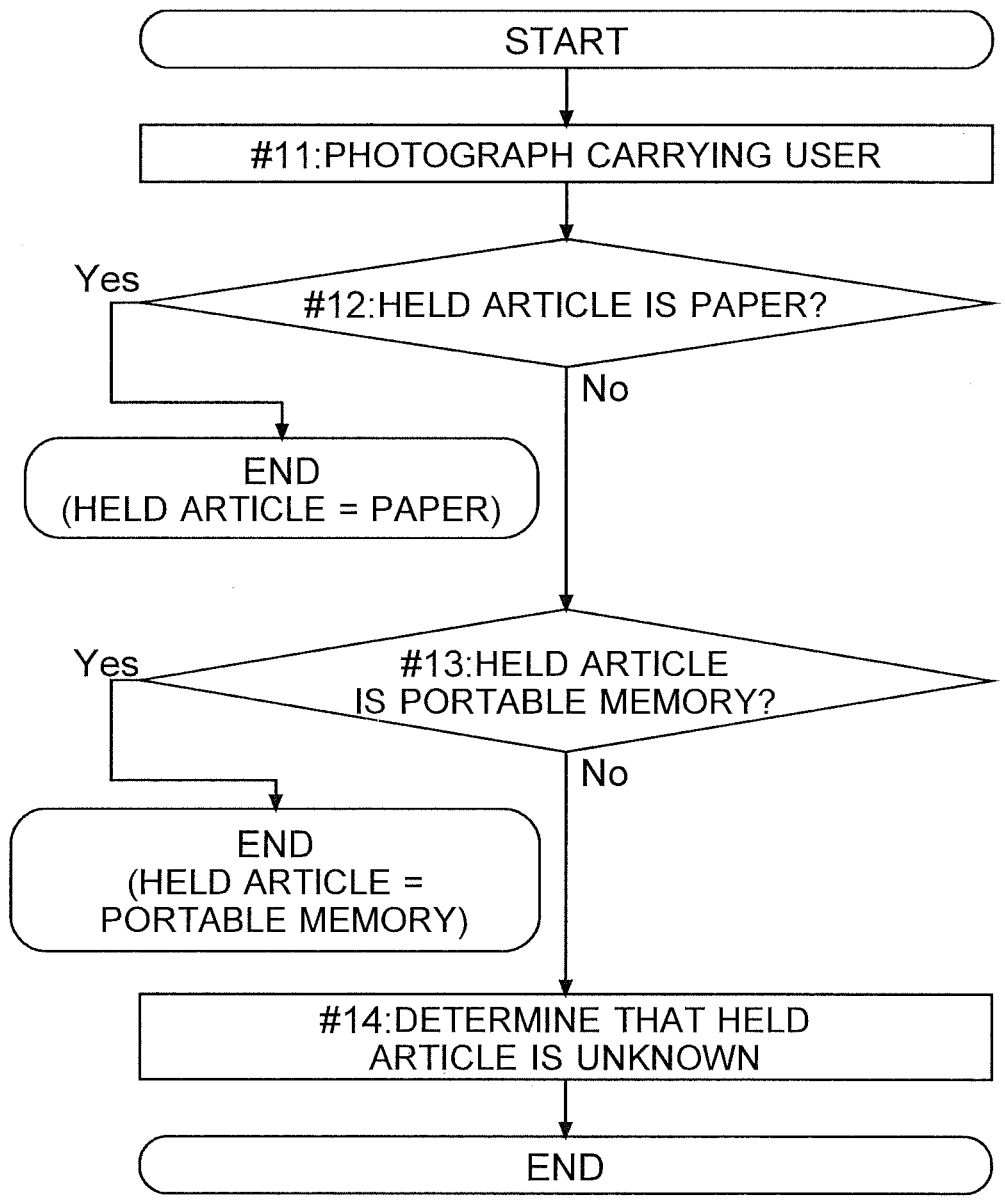
FIG. 4 is a view showing one example of a flow of determination of a held article by the image forming apparatus according to the embodiment and the modification example.

Next, with reference to FIG. 4, a description is given of one example of a flow of determination of a held article by the image forming apparatus 1 according to the embodiment. The communication unit 15 of the image forming apparatus 1 is wirelessly communicable with the wireless communication unit 28 of the portable communication device 2. When the portable communication device 2 has entered a short-range wireless communication-enabled area of the communication unit 15, the communication unit 15 recognizes that the portable communication device 2 has entered the short-range wireless communication-enabled area of its own. The communication unit 15 and the wireless communication unit 28 start communicating with each other. In FIG. 4, START corresponds to a point in time when the communication unit 15 becomes communicable with the wireless communication unit 28 (the portable communication device 2).

First, the control unit 10 of the image forming apparatus 1 controls the camera 17 to photograph a holding user (a carrying user) holding the portable communication device 2 (step #11). In other words, the control unit 10 controls the camera 17 to photograph the carrying user approaching toward the image forming apparatus 1. Then, based on photographing data obtained through photographing, the control unit 10 determines a held article.

The photographing data is one type of image data. Based on the photographing data, the control unit 10 (the image processing unit 10b) determines the article held by the carrying user. First, the control unit 10 recognizes a moving object portion in each piece of photographing data. In a case where the carrying user approaches the image forming apparatus 1, the carrying user is approaching the camera 17. When the carrying user is approaching the camera 17, a size of the carrying user in the photographing data changes. By making a comparison among a plurality of sheets of images as the photographing data, the moving object portion can be identified.

In order to recognize the moving object portion, the control unit 10 performs control so that photographing is performed a plurality of number of times at prescribed time intervals. A configuration may be adopted in which while the communication unit 15 is communicable with the portable communication device 2, the control unit 10 controls the camera 17 to periodically perform photographing. Or alternatively, the number of times of performing photographing may be preset. This makes it possible to obtain a plurality of sheets of images as the photographing data. The control unit 10 compares each piece of photographing data with other pieces of photographing data. With respect to each piece of photographing data, the control unit 10 determines a pixel region different from those of other pieces of photographing data. The control unit 10 determines that the pixel region that has thus been changed is the moving object portion.

The control unit 10 recognizes a skin color pixel region within the pixel region determined to be the moving object portion. With respect to each piece of photographing data, the control unit 10 recognizes the skin color pixel region. A pixel value handled as a skin color is preset. With respect to each piece of photographing data, the control unit 10 determines a hand portion within the skin color pixel region thus recognized. In a case where the carrying user has been photographed, typically, a portion extending from a face to a neck and a hand portion of the carrying user are each determined as the skin color pixel region. Typically, a face and a neck are positioned on an upper side with respect to a hand. Based on this, for example, the control unit 10 determines a second or third one of the skin color pixel regions from the top as the hand portion.

The control unit 10 determines whether or not the article held by the carrying user is a sheet(s) of paper (step #12). Specifically, in each piece of photographing data, the control unit 10 checks a pixel in a vicinity of the skin color pixel region corresponding to a hand. In a plurality or all of pieces of photographing data, it is checked whether or not a white region having a size equal to or larger than a given size has been photographed in a vicinity of the hand. A pixel value handled as white is preset. When the white region having a size equal to or larger than the given size is present in the vicinity of the hand, the control unit 10 determines that the article held by the carrying user is a sheet(s) of paper (Yes at step #12). When it has been determined that the held article is a sheet(s) of paper, the control unit 10 ends this flow (END). When no white region having a size equal to or larger than the given size is present in the vicinity of the hand, the control unit 10 determines that the carrying user is not holding a sheet(s) of paper (No at step #12). The control unit 10 may use any other algorithm as a basis for determining whether or not the carrying user is holding a sheet(s) of paper.

In a case of No at step #12, the control unit 10 determines whether or not the article held by the carrying user is the portable memory 3 (step #13). The portable memory 3 is, for example, a USB memory or a memory card. For example, the storage unit 11 stores a plurality of template images of the portable memory 3. The template images may be each an image of part of the portable memory 3 such as a connector portion of a USB memory. The control unit 10 checks whether or not a pattern identical or similar to any of the template images is included in each piece of photographing data. When any piece of photographing data includes an image whose degree of similarity to any of the template images is equal to or higher than a prescribed value, the control unit 10 determines that the portable memory 3 is being held (Yes at step #13). When it has been determined that the held article is the portable memory 3, the control unit 10 ends this flow (END).

When none of the pieces of photographing data includes such an image whose degree of similarity to any of the template images is equal to or higher than the prescribed value, the control unit 10 determines that the portable memory 3 is not being held (No at step #13). The control unit 10 may use any other algorithm as a basis for determining whether or not the portable memory 3 is being held. When, in a plurality or all of the pieces of photographing data, it cannot be determined that a sheet(s) of paper or the portable memory 3 is being held (No at step #13), the control unit 10 determines that the held article is unknown (step #14). Then, the control unit 10 ends this flow (END).

(Storage of Movement History Data 5)

Figure 5:
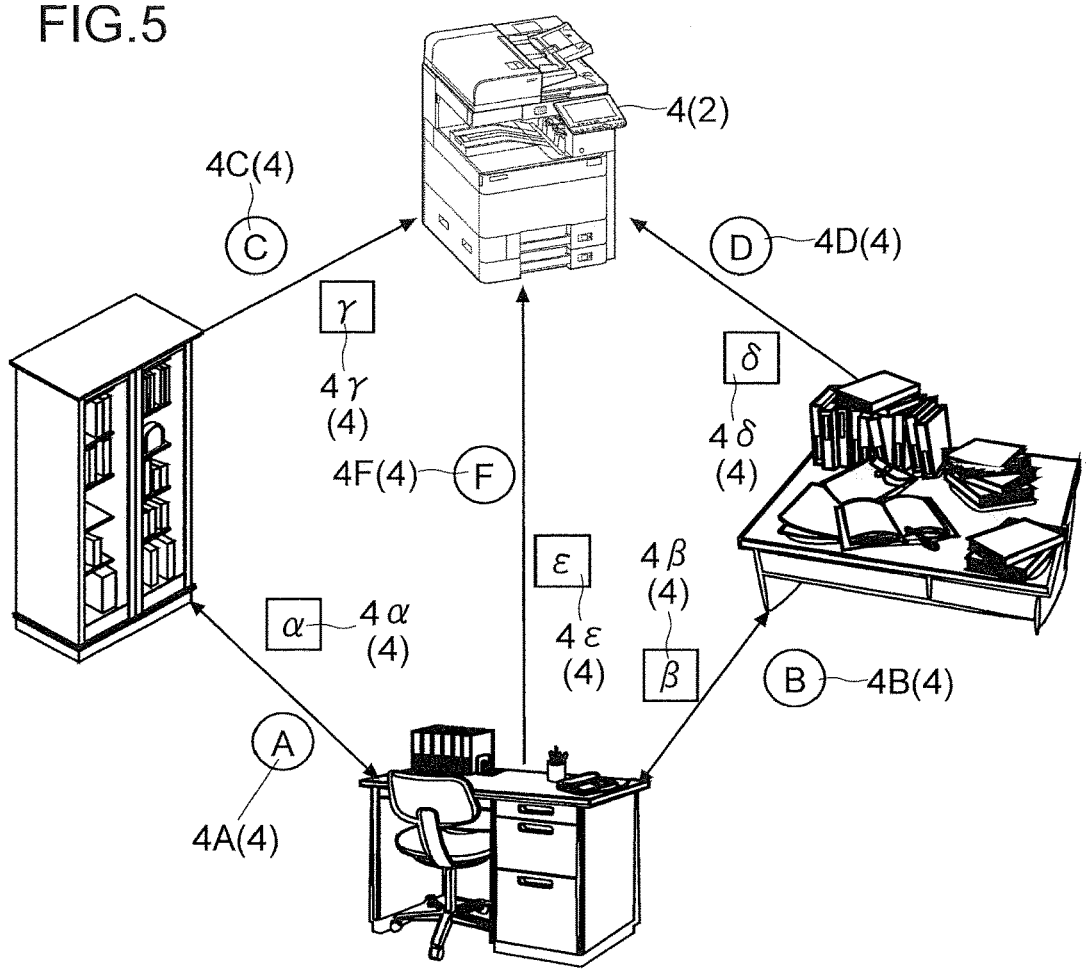
FIG. 5 is a view for explaining one example of storage of movement history data according to the embodiment and the modification example.

Next, with reference to FIG. 5, a description is given of storage of movement history data 5 in the portable communication device 2 according to the embodiment. FIG. 5 explains how the movement history data 5 is stored indoors. The movement history data 5 may be stored not only in an office but also outdoors.

An upper middle drawing in FIG. 5 shows the image forming apparatus 1. A lower middle drawing in FIG. 5 shows a workstation (a desk) of a carrying user. A right-side drawing in FIG. 5 in shows a workstation of the carrying user's superior. A left-side drawing in FIG. 5 depicts a depository (a library) housing literature and papers. The following describes movement of the carrying user in an office. The movement history data 5 is stored also in a case of movement outside the office.

Furthermore, each circle containing an uppercase alphabetic character in FIG. 5 indicates a wireless device based on the Wi-Fi standards as the wireless device 4. In other words, each circle containing an uppercase alphabetic character is an access point. The access point refers to the wireless device 4 for constructing a wireless local network. For example, the access point is installed on a ceiling. Furthermore, each quadrangle containing a lowercase Greek character in FIG. 5 indicates a wireless device based on the Bluetooth standards as the wireless device 4. The portable communication device 2 communicates with the image forming apparatus 1. The image forming apparatus 1 in FIG. 5, therefore, is also one type of wireless device 4.

The information storage unit 21 of the portable communication device 2 stores the movement history data 5. The movement history data 5 indicates a history of movement of the carrying user. The route acquisition application 29 is operating in the portable communication device 2. Based on the route acquisition application 29, the processing unit 20 causes the information storage unit 21 to store the movement history data 5. Specifically, as the carrying user moves, the portable communication device 2 may newly enter a communicable area of the wireless device 4. For example, the portable communication device 2 receives a beacon signal from the wireless device 4.

At this time, the processing unit 20 causes the wireless communication unit 28 to communicate with a wireless device, as the wireless device 4, that has newly become communicable therewith. The processing unit 20 recognizes the wireless device 4 that has newly become communicable therewith. The processing unit 20 causes the wireless communication unit 28 to acquire identification information for identifying the wireless device 4. The processing unit 20 causes the information storage unit 21 to store, as the movement history data 5, data composed of pieces of identification information that are arranged in order of acquisition (in chronological order). By using the route acquisition application 29, a piece of identification information for identifying the image forming apparatus 1 can be registered beforehand in the information storage unit 21. Having newly acquired the piece of identification information for identifying the image forming apparatus 1, the processing unit 20 can recognize that it has approached the image forming apparatus 1.

The processing unit 20 may cause the wireless communication unit 28 to acquire, as the identification information, a MAC address of the wireless device 4. The processing unit 20 may also cause the wireless communication unit 28 to acquire any other form of identification information than a MAC address. For example, the processing unit 20 may acquire ID information such as an SSID.

For example, a case is considered in which in FIG. 5, a person rises from his/her own seat and takes out a document (literature) in the library, after which the person makes a photocopy of the document with the image forming apparatus 1. In this case, the wireless communication unit 28 becomes communicable with a wireless device 4A, a wireless device 4α, a wireless device 4C, a wireless device 4γ, and the image forming apparatus 1 in this order. Every time the processing unit 20 enters a communicable area of a new wireless device as the wireless device 4, the processing unit 20 causes the wireless communication unit 28 to acquire a piece of identification information. Every time a piece of identification information is acquired, the processing unit 20 causes the information storage unit 21 to add the piece of identification information thus newly acquired to the movement history data 5 (i.e. to update the movement history data 5). In this example, as the movement history data 5, data in which a piece of identification information for identifying the wireless device 4A, a piece of identification information for identifying the wireless device 4α, a piece of identification information for identifying the wireless device 4C, a piece of identification information for identifying the wireless device 4γ, and a piece of identification information for identifying the image forming apparatus 1 are described in this order is stored in the information storage unit 21.

Here, in a case of a movement route from the library→the image forming apparatus 1, it can be presumed that a copy job is highly likely to be executed. In other words, in a case where the movement history data 5 indicates a movement route from the wireless device 4A→the wireless device 4α→the wireless device 4C→the wireless device 4γ→the image forming apparatus 1, it can be presumed that a copy job is highly likely to be executed.

A description is given of another example. For example, a case is considered in which a person rises from his/her own seat, obtains his/her superior's signature on a document, and executes a scan storage job with respect to the document. In this case, this carrying user moves from the workstation (the desk) toward his/her superior's desk. After obtaining the superior's signature, the carrying user moves toward the image forming apparatus 1. A movement route of the carrying user is expressed as the workstation (his/her own desk)→the superior's desk→the image forming apparatus 1. From a different perspective, in a case of the movement route from the workstation (his/her own desk)→the superior's desk→the image forming apparatus 1, a scan storage job is highly likely to be executed. That is, before executing a particular job, a carrying user may move in a given manner.

Furthermore, in a task, how to handle a document may be set beforehand. For example, a storage destination of image data of a document with a superior's signature thereon may be set beforehand. In this case, in a scan storage job, a particular folder (storage destination or destination) is set as a set value. Furthermore, a file format of image data to be stored may be set. In this case, in a scan storage job, a particular file format is set as a set value. A set value to be set may be almost predetermined depending on a movement pattern.

In view of the above, the image forming apparatus 1 learns a movement route to arrive at the image forming apparatus 1, a type of a job that has often been executed with respect to the movement route, and a set value that has often been set with respect thereto. For this learning, the control unit 10 of the image forming apparatus 1 controls the storage unit 11 to store setting information 6. The setting information 6 includes set value data 7 and route data 8 (see FIG. 7).

The set value data 7 indicates a type of a job that has been executed and a set value of each setting item. The route data 8 indicates a movement route taken, when a job corresponding to the set value data 7 is executed, by the portable communication device 2 (a carrying user) until communication with the communication unit 15 (the image forming apparatus 1) is enabled. Based on the setting information 6 (the set value data 7 and the route data 8), the control unit 10 sets the set value (this will be detailed later).

(Acquisition of Present Route Information)

Figure 6:
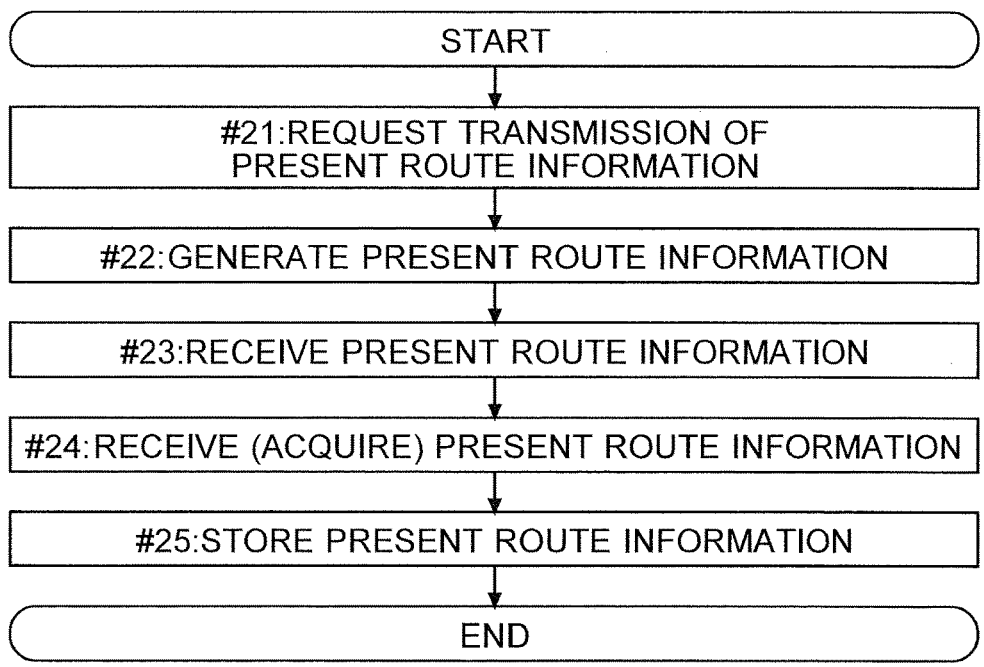
FIG. 6 is a view showing one example of a flow of acquisition of present route information by the image forming apparatus according to the embodiment.

Next, with reference to FIG. 6, a description is given of one example of a flow of acquisition of present route information by the image forming apparatus 1 according to the embodiment. FIG. 6 is a view showing one example of the flow of acquisition of present route information by the image forming apparatus 1 according to the embodiment.

In FIG. 6, START corresponds to a point in time when the communication unit 15 becomes communicable with the portable communication device 2. When communication with the portable communication device 2 has been newly enabled (when a wirelessly communicable device as the portable communication device 2 has appeared), the control unit 10 of the image forming apparatus 1 controls the communication unit 15 to transmit a transmission request to transmit the present route information to the portable communication device 2 (step #21).

When the wireless communication unit 28 has received the transmission request to transmit the present route information, the processing unit 20 of the portable communication device 2 generates a piece of present route information (step #22). Then, the processing unit 20 causes the wireless communication unit 28 to transmit the piece of present route information thus generated to the communication unit 15 of the image forming apparatus 1 (step #23).

The present route information is data based on the movement history data 5. The present route information is data indicating a movement route taken by a carrying user until communication with the image forming apparatus 1 is enabled. The processing unit 20 generates the present route information. As the present route information, the processing unit 20 excerpts, from the movement history data 5, pieces of identification information for identifying a prescribed number of wireless devices 4, which are sequential in reverse chronological order. The processing unit 20 excerpts the pieces of identification information for identifying the prescribed number of wireless devices 4 in order from a piece of identification information for identifying one of the wireless devices 4 that has become communicable most recently. The prescribed number is set as appropriate. For example, the prescribed number can be several to a dozen or so. In the present route information, a chronologically last one of the pieces of identification information is a piece of identification information for identifying one of the wireless devices 4 that has become communicable immediately before the image forming apparatus 1 does. The last piece of identification information may be a piece of identification information for identifying the image forming apparatus 1.

For example, it is assumed that, in the movement history data 5, pieces of identification information are stored in order of priority from the wireless device 4A→the wireless device 4α→the wireless device 4C→the wireless device 4γ→the image forming apparatus 1. In a case where the prescribed number is three, the processing unit 20 generates, as the present route information, data in which a piece of identification information for identifying the wireless device 4α, a piece of identification information for identifying the wireless device 4C, and a piece of identification information for identifying the wireless device 4γ are described in this order (a combination of pieces of identification information). The communication unit 15 of the image forming apparatus 1 receives (acquires) the present route information (step #24). The control unit 10 controls the storage unit 11 (the RAM 11a) to store the present route information thus received (step #25). Then, the control unit 10 ends this flow (END).

(Accumulation of Setting Information 6)

Figure 7:
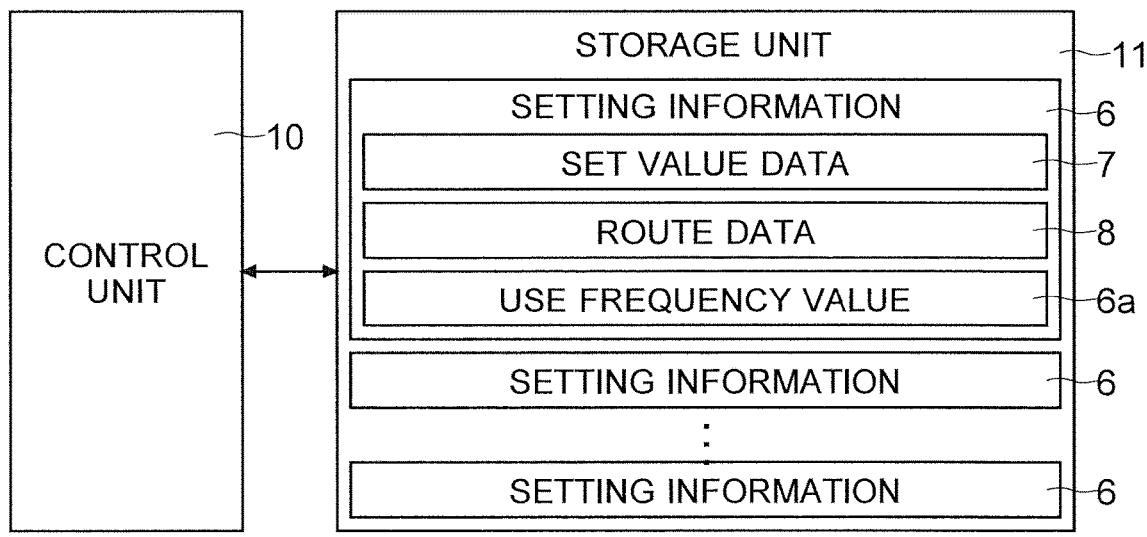
FIG. 7 is a view showing one example of contents stored in the image forming apparatus according to the embodiment.
Figure 8:
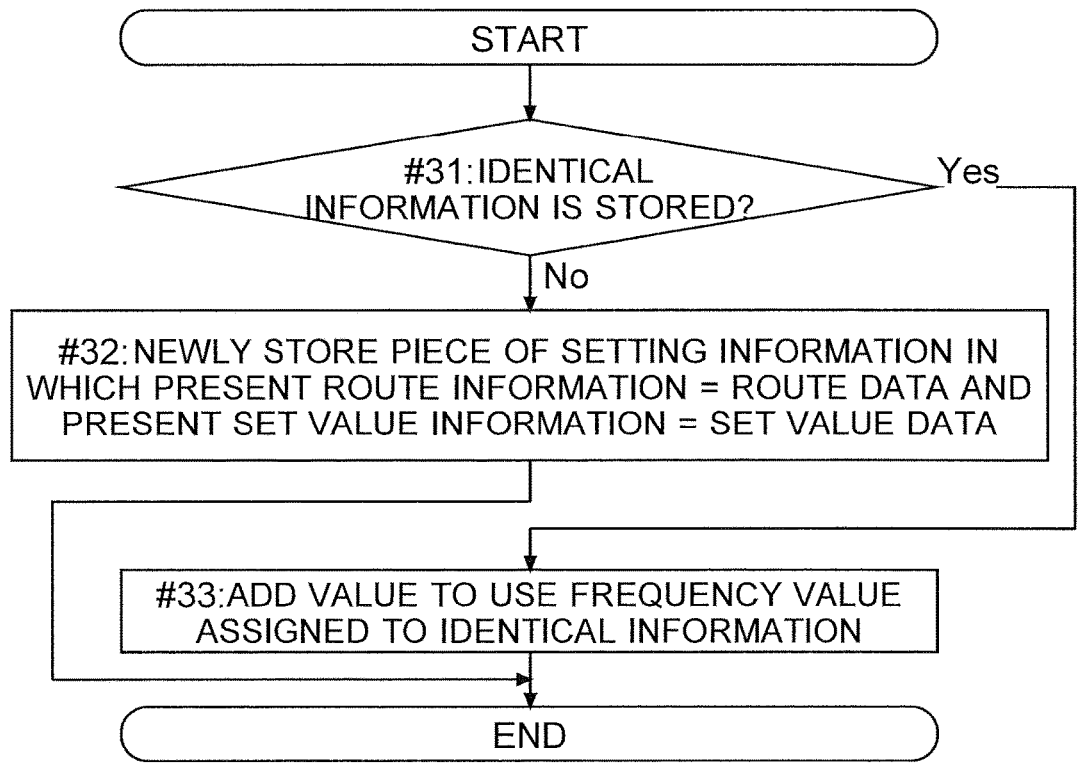
FIG. 8 is a view showing one example of a flow of accumulation of setting information in the image forming apparatus according to the embodiment.

Next, with reference to FIG. 7 and FIG. 8, a description is given of one example of accumulating the setting information 6 in the image forming system 100 according to the embodiment. In order to learn a type of a job corresponding to a movement route and a set value therefor, the control unit 10 of the image forming apparatus 1 controls the storage unit 11 to accumulate the setting information 6. The storage unit 11 (the storage 11c) stores a plurality of pieces of setting information 6 in a non-volatile manner. The setting information 6 is information used for automatic setting of set values. The setting information 6 includes the set value data 7, the route data 8, and a use frequency value 6a. The automatic setting of set values based on the setting information 6 will be detailed later.

Here, the control unit 10 controls the storage unit 11 (the RAM 11a) to store present set value information 9 (see FIG. 2). The present set value information 9 indicates a set value of each setting item presently set for a job about to be executed. The present set value information 9 is data indicating a present set value. The control unit 10 performs control so that all set values of setting items for a job of a selected type are stored as the present set value information 9.

In a case where a person has approached the image forming apparatus 1 without carrying the portable communication device 2 or a case where the control unit 10 does not perform automatic setting of set values based on the setting information 6 stored in the storage unit 11, set values of all setting items for a type of a job initially selected on the operation panel 12 are set to default values. The storage unit 11 (the storage 11c) stores default set value data 9a in a non-volatile manner. The default set value data 9a is data defining default set values of various setting items. With this configuration, when the operation panel 12 has accepted a selection of a job type, the control unit 10 reads out a corresponding piece of default set value data 9a. Then, the control unit 10 uses, as the present set value information 9, the piece of default set value data 9a thus read out.

A carrying user changes a set value so that a desired result is obtained. For example, double-sided printing is disabled by default. In performing double-sided printing, the carrying user changes a set value of a double-sided printing function so that the double-sided printing is enabled. When the set value has thus been changed, the control unit 10 updates the present set value information 9. The control unit 10 writes a changed set value into the present set value information 9.

When all set values are set as desired, the carrying user issues a job execution start instruction to start executing a job. For example, the carrying user operates the start key of the operation panel 12. The operation panel 12 accepts the job execution start instruction. Upon the job execution start instruction being issued (upon the start key being operated), based on the present set value information 9, the control unit 10 controls the printing unit 14, the image reading unit 13, or the communication unit 15 to execute the job.

In FIG. 8, START corresponds to a point in time when a carrying user (the portable communication device 2) has approached the image forming apparatus 1 and causes the image forming apparatus 1 to start executing a job. In other words, this is a point in time when the job is started in a state where communication with the portable communication devices 2 with which the present route information has been exchanged remains enabled. Prior to execution of the job, the carrying user has selected beforehand a required setting item and set a set value thereof. Furthermore, the portable communication device 2 has transmitted beforehand the present route information to the image forming apparatus 1. The control unit 10 starts processing for accumulating the setting information 6.

First, the control unit 10 checks whether or not the storage unit 11 stores identical information (step #31). The identical information is a piece of setting information 6 in which the route data 8 is identical to the present route information and the set value data 7 is identical to a piece of present set value information 9 corresponding to the job whose execution has been started. At step #31, it is checked whether or not a job that is identical in movement route and equal in set value to the job executed this time has ever been executed in the past.

When no identical information is stored (No at step #31), the control unit 10 of the image forming apparatus 1 controls the storage unit 11 to store a new piece of setting information 6 (step #32). The piece of setting information 6 to be stored includes, as the route data 8, a most recently acquired piece of present route information. The piece of setting information 6 to be stored also includes, as the set value data 7, a piece of present set value information 9 corresponding to the present job for which the execution start instruction has been issued. Then, the control unit 10 ends this flow (END). Thus, a movement pattern of the carrying user and a set value for the job corresponding to the movement pattern are accumulated.

When the identical information is stored (Yes at step #31), the control unit 10 of the image forming apparatus 1 adds a value to the use frequency value 6a assigned to the identical information (step #33). Then, the control unit 10 ends this flow (END). For example, the control unit 10 adds 1 to the use frequency value 6a of a piece of setting information 6 that has been determined to be the identical information. It is possible to learn, based on the use frequency value 6a, a combination of frequently used set values with respect to a certain movement route.

(Automatic Setting of Set Values Performed in Image Forming Apparatus 1)

Figure 9:
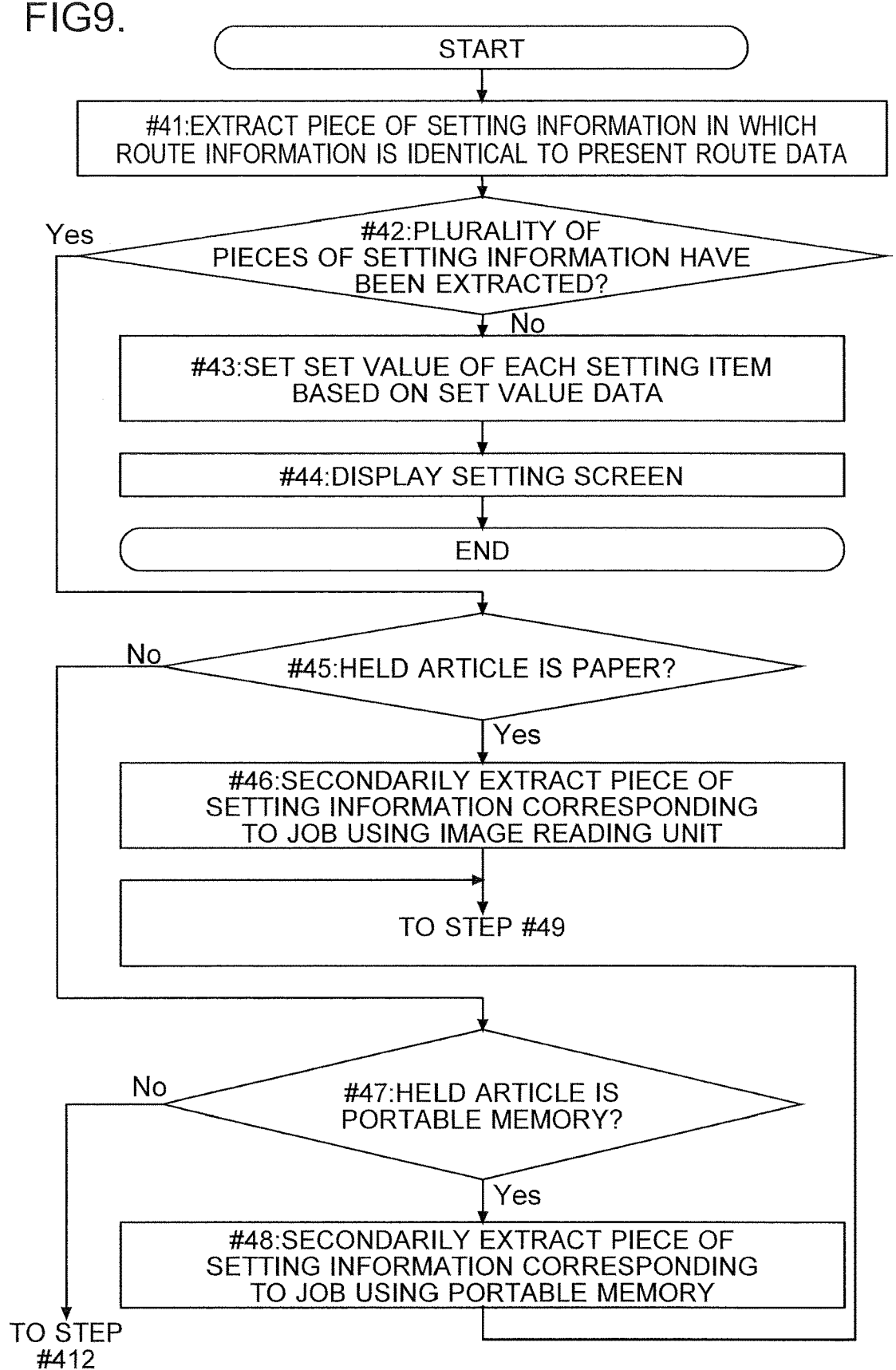
FIG. 9 is a view showing one example of automatic setting of a set value in the image forming apparatus according to the embodiment.
Figure 10:
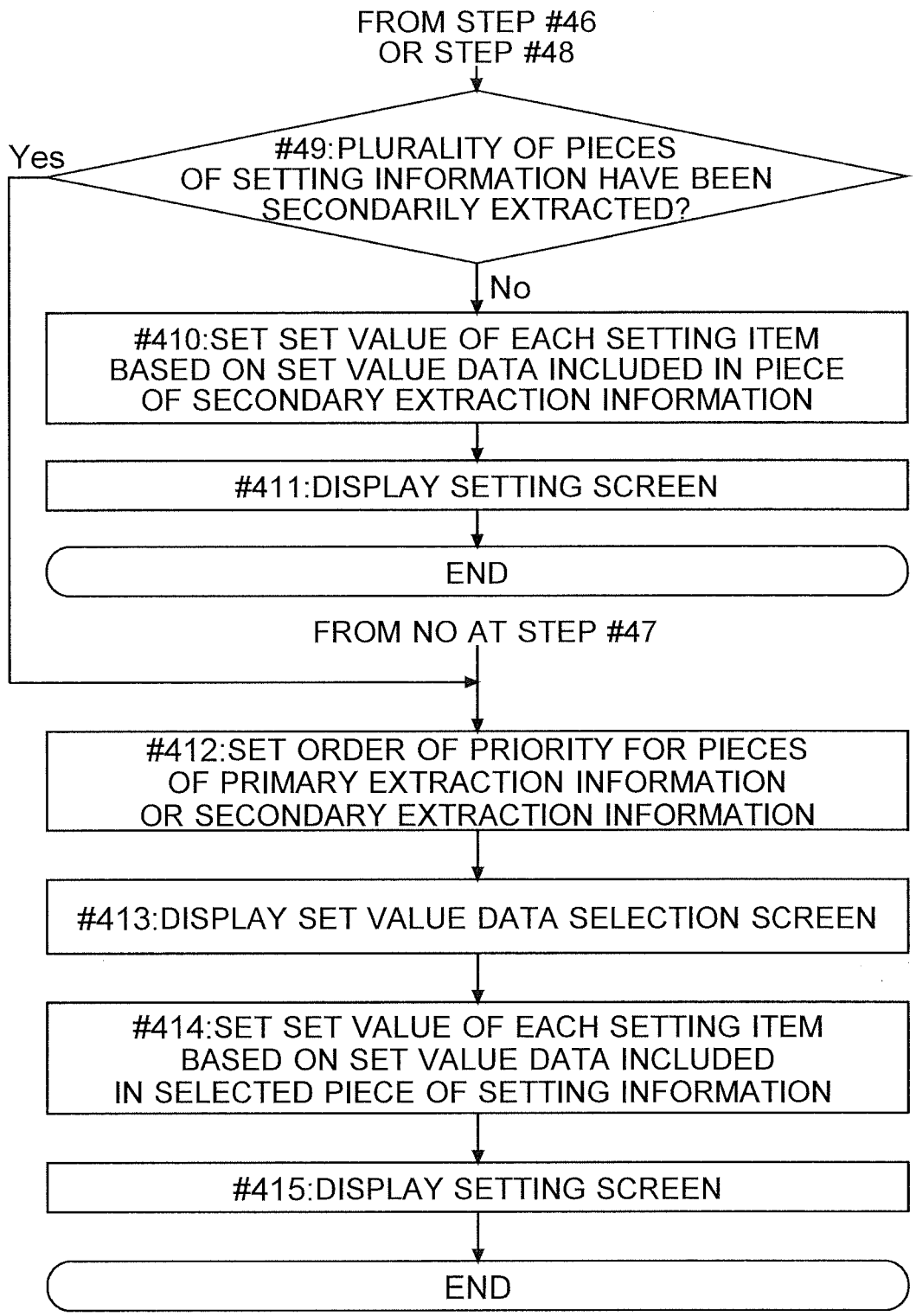
FIG. 10 is a view showing one example of automatic setting of a set value in the image forming apparatus according to the embodiment.
Figure 11:
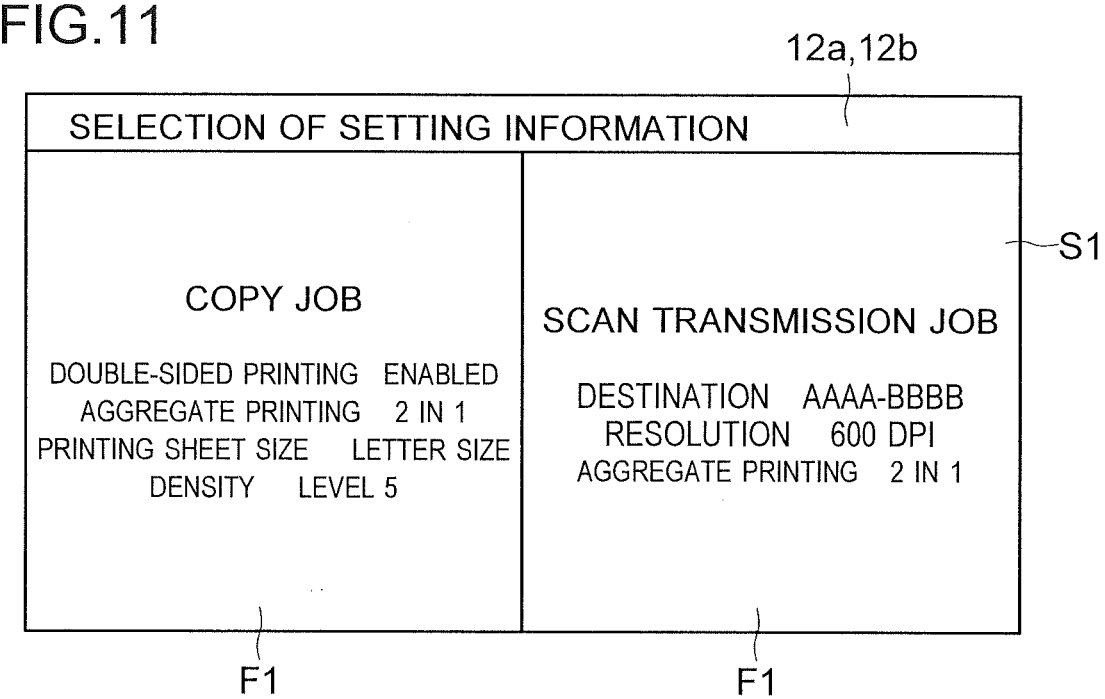
FIG. 11 is a view showing one example of a selection screen according to the embodiment and the modification example.

Next, with reference to FIG. 9 to FIG. 11, a description is given of one example of automatic setting of set values performed in the image forming apparatus 1 according to the embodiment. In using the image forming apparatus 1, a carrying user approaches the image forming apparatus 1. In FIG. 9, START corresponds to a point in time when communication between the image forming apparatus 1 and the portable communication device 2 is enabled. In other words, this is a point in time when the image forming apparatus 1 acquires the present route information from the portable communication device 2 that has entered a communicable area thereof. Upon acquisition of the present route information, the control unit 10 of the image forming apparatus 1 extracts, from the setting information 6 stored in the storage unit 11, a piece of setting information 6 in which the route data 8 is identical to the present route information (step #41). In the following description, the piece of setting information 6 extracted at step #41 by the control unit 10 is referred to as primary extraction information. Next, the control unit 10 checks whether or not a plurality of pieces of setting information 6 have been extracted (there are a plurality of pieces of primary extraction information) (step #42).

When there is one extracted piece of setting information 6 (No at step #42), based on the set value data 7 included in the piece of setting information 6 thus extracted, the control unit 10 sets a set value of each setting item (step #43). Specifically, the control unit 10 rewrites the present set value information 9 stored in the storage unit 11. The control unit 10 writes the set value data 7 included in the thus extracted piece of setting information 6 into a storage region of the present set value information 9. Thus, a set value corresponding to a movement pattern can be automatically set. A set value for a job executed previously at the time of following the same behavior pattern can be reproduced. Then, the control unit 10 controls the display panel 12a to display a setting screen (step #44→END).

The control unit 10 controls the display panel 12a to display a setting screen for a type of a job corresponding to the extracted piece of setting information 6. For example, when the extracted piece of setting information 6 includes a piece of set value data 7 corresponding to a copy job, the control unit 10 controls the display panel 12a to display a setting screen for the copy job. Furthermore, the control unit 10 controls the display panel 12a to display a setting screen in which set values defined by the set value data 7 included in the extracted piece of setting information 6 are reflected. In order to show the set values that have been automatically set, the control unit 10 may control the display panel 12a to display a list of set values different from default values. The carrying user who has come to the image forming apparatus 1 can be notified of contents that have been set.

When there are a plurality of extracted pieces of setting information 6 (the primary extraction information) (Yes at step #42), the control unit 10 checks whether or not it has been determined that an article held by the carrying user is a sheet(s) of paper (step #45). When it has been determined that the held article is a sheet(s) of paper (Yes at step #45), the control unit 10 further extracts, from the plurality of pieces of primary extraction information, a piece of setting information 6 corresponding to a job using the image reading unit 13 (step #46). For example, the control unit 10 further extracts, from the extracted pieces of setting information 6, pieces of setting information 6 corresponding to a copy job, a scan storage job, and a scan transmission job. In the following description, a piece of setting information 6 further extracted from the primary extraction information based on a held article is referred to as secondary extraction information.

When it has not been determined that the held article is a sheet(s) of paper (No at step #45), the control unit 10 checks whether or not it has been determined that the article held by the carrying user is the portable memory 3 (step #47). When it has been determined that the held article is the portable memory 3 (Yes at step #47), the control unit 10 further extracts, from the plurality of pieces of primary extraction information, a piece of setting information 6 corresponding to a job using the portable memory 3 (step #48). For example, the control unit 10 further extracts, from the extracted pieces of setting information 6, a piece of setting information 6 corresponding to a memory connection printing job.

After step #46 or step #48, the control unit 10 checks whether or not there are a plurality of pieces of secondary extraction information (step #49). When there is one piece of secondary extraction information (No at step #49), based on the set value data 7 included in the piece of secondary extraction information, the control unit 10 sets a set value of each setting item (step #410). Specifically, the control unit 10 controls the storage unit 11 to update the present set value information 9 so as to reproduce set values defined by the set value data 7 included in the piece of secondary extraction information. Thus, a set value corresponding to a combination of a movement pattern and a held article can be automatically set. Furthermore, a set value for a job executed previously at the time of following the same behavior pattern while holding a sheet(s) of paper or the portable memory 3 can be reproduced. Then, the control unit 10 controls the display panel 12a to display a setting screen (step #411→END).

At step #411, the control unit 10 controls the display panel 12a to display a setting screen for a type of a job corresponding to the piece of secondary extraction information. Furthermore, the control unit 10 controls the display panel 12a to display a setting screen in which set values defined by the set value data 7 included in the piece of secondary extraction information are reflected. In order to show the set values that have been automatically set, the control unit 10 may control the display panel 12a to display a list of set values different from default values.

When a plurality of pieces of primary extraction information have been extracted and determination of a held article has failed (No at step #47) or when there are a plurality of pieces of secondary extraction information (Yes at step #49), the control unit 10 sets an order of priority for the extracted pieces of setting information 6 (step #412). Specifically, when a plurality of pieces of primary extraction information have been extracted and determination of a held article has failed, the control unit 10 sets an order of priority for the pieces of primary extraction information. When a plurality of pieces of secondary extraction information have been extracted, the control unit 10 sets an order of priority for the pieces of secondary extraction information. The control unit 10 gives a higher priority to a piece of setting information 6 with a larger value of the use frequency value 6a.

The control unit 10 (the image forming apparatus 1) controls the display panel 12a to display a selection screen S1 (step #413). FIG. 11 shows one example of the selection screen S1. The selection screen S1 is a screen for allowing a carrying user to select a piece of set value data 7 included in the primary extraction information or the secondary extraction information.

The selection screen S1 is divided into a plurality of regions. In an example shown in FIG. 11, two of the plurality of regions of the thus divided selection screen S1 are each used as a selection region F1. The selection region F1 is a region for displaying contents of the set value data 7 included in an extracted piece of setting information 6. The number of the selection regions F1 is not limited to two. Three or more selection regions may be provided. Specifically, when a plurality of pieces of primary extraction information have been extracted and determination of a held article has failed, the control unit 10 performs control so that contents of the set value data 7 included in each of the pieces of primary extraction information are displayed in one of the selection regions F1 in one-to-one correspondence with each other. When a plurality of pieces of secondary extraction information have been extracted, the control unit 10 performs control so that contents of the set value data 7 included in each of the pieces of secondary extraction information are displayed in any one of the selection regions F1. FIG. 11 shows an example in which a job type, a name of a setting item having a value different from a default value, and a set value different from the default value are displayed within the selection region F1.

The control unit 10 selects, from among the extracted pieces of setting information 6, a number of display candidates equal to the number of the selection regions F1. The control unit 10 selects the display candidates in order from one of the pieces of setting information 6 that is highest in priority. In a case of FIG. 11, one of the pieces of setting information 6 that is highest in priority and another one of the pieces of setting information 6 that is second highest in priority are selected. Specifically, when a plurality of pieces of primary extraction information have been extracted and determination of a held article has failed, the control unit 10 selects display candidates from among the plurality of pieces of primary extraction information in a descending order of priority. When a plurality of pieces of the secondary extraction information have been extracted, display candidates are selected from among the plurality of pieces of secondary extraction information in a descending order of priority.

A user (a carrying user) touches one of the selection regions F1 that includes a set value he/she wishes to use. The operation panel 12 accepts a selection of a piece of setting information 6 (the set value data 7, the selection region F1). Based on an output of the touch panel 23, the control unit 10 recognizes the piece of setting information 6 thus selected. Thus, when there are a plurality of patterns of frequently-set set values with respect to a movement route (a movement pattern), a desired piece of set value data 7 can be selected.

Based on the set value data 7 included in the piece of setting information 6 (the primary extraction information or the secondary extraction information) selected on the selection screen S1, the control unit 10 (the image forming apparatus 1) sets a set value of each setting item (step #414). Specifically, the control unit 10 controls the storage unit 11 to update the present set value information 9 so as to reproduce set values defined by the set value data 7 selected. Then, the control unit 10 controls the display panel 12*a* to display the setting screen (step #415→END). Step #415 is performed in a similar manner to step #44 and step #411.

(Switching of Piece of Setting Information 6 to be Used)

Figure 12:
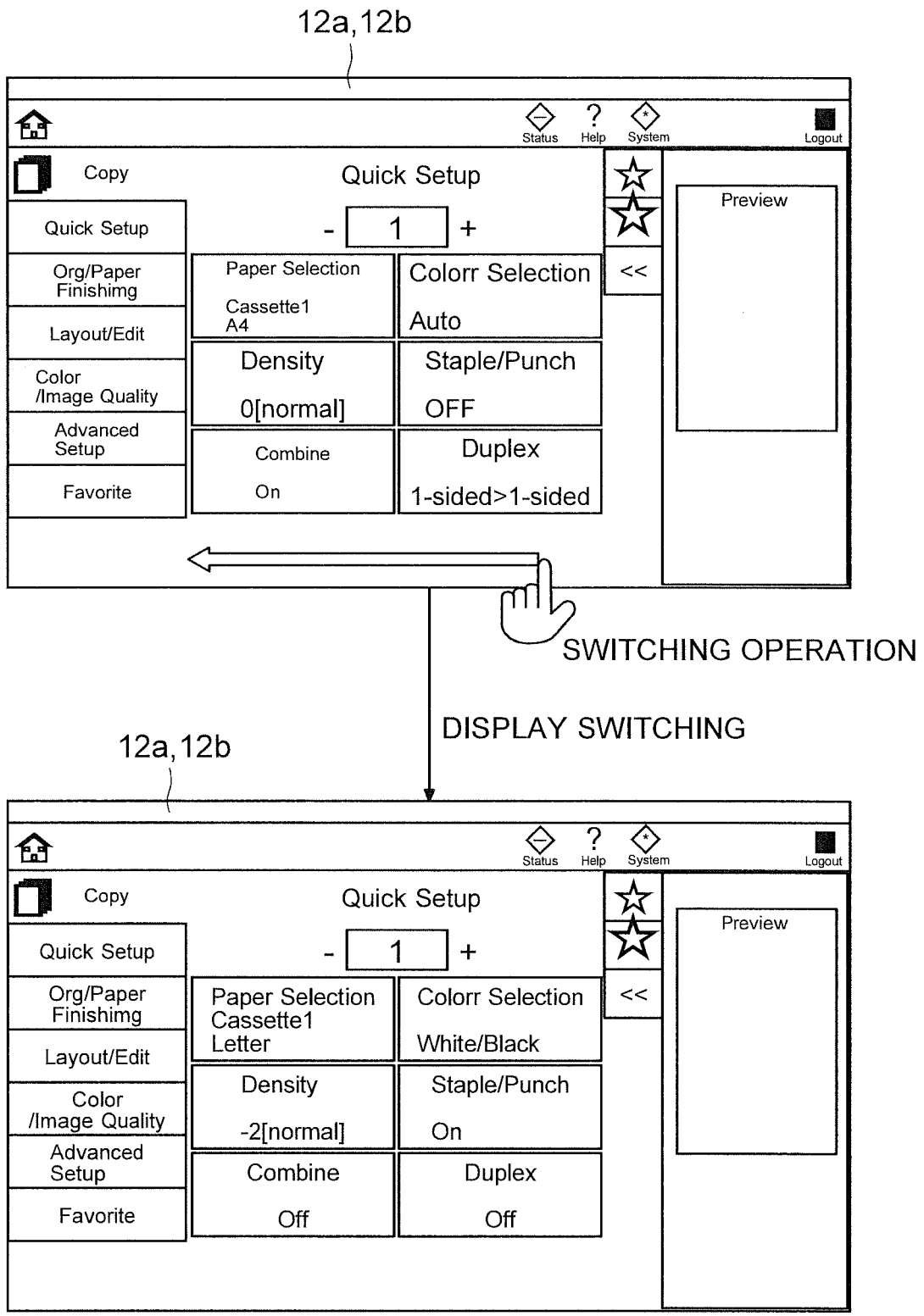
FIG. 12 is a view showing one example of switching of setting information (set value data) according to the embodiment and the modification example.

Next, with reference to FIG. 12, a description is given of one example of switching of the setting information 6 according to the embodiment. FIG. 12 is a view showing one example of switching of the setting information 6 (the setting value data 7) according to the embodiment.

There may be a case where, even though a piece of setting information 6 (set value data 7) has been selected on the selection screen S1, it is wished to perform setting based on a different piece of setting information 6. In the image forming apparatus 1, switching of a piece of setting information 6 to be used can be performed. When switching a piece of setting information 6 to be used, a carrying user performs a switching operation. The operation panel 12 accepts the switching operation. A type of operation handled as the switching operation can be set as appropriate. FIG. 12 shows an example in which a flick operation (a swipe operation) of flicking a background region (a region including no operation image) of a setting screen is handled as the switching operation. The flick operation is an operation in which a touch position is moved in a sliding manner while a touch thereon is maintained. An operation in which a touch position is moved a given distance or more can be set as the switching operation.

When the switching operation has been performed in a preset first direction, the control unit 10 newly selects one of pieces of setting information 6 that comes next in a descending order of priority to a presently selected one of the pieces of setting information 6. When the switching operation has been performed so that a touch position is moved in a preset second direction, the control unit 10 newly selects one of the pieces of setting information 6 that comes next in an ascending order of priority to the presently selected one of the pieces of setting information 6. The second direction is a direction opposite to the first direction. The first direction is set as appropriate. For example, a leftward direction can be set as the first direction. In this case, the second direction is a rightward direction. A downward direction may be set as the first direction. In this case, the second direction is an upward direction.

Upon the operation panel 12 accepting the switching operation, based on the set value data 7 included in the newly selected piece of setting information 6, the control unit 10 sets a set value of each setting item. The control unit 10 handles the set value data 7 included in the newly selected piece of setting information 6 as the present set value information 9. Then, the control unit 10 changes a screen displayed on the display panel 12*a*.

The control unit 10 controls the display panel 12*a* to display a setting screen for a type of a job corresponding to the set value data 7 included in the newly selected piece of setting information 6. Furthermore, the control unit 10 controls the display panel 12*a* to display a setting screen in which set values defined by the set value data 7 included in the newly selected piece of setting information 6 are reflected. The control unit 10 may control the display panel 12*a* to display, for a given length of time, a list of set values different from default values. FIG. 12 shows one example of how set values and a setting screen are changed as a result of the switching operation. An upper drawing in FIG. 12 shows one example of a setting screen before the switching operation. A lower drawing in FIG. 12 shows one example of a setting screen after the switching operation.

In executing a job using a combination of particular set values, a carrying user may behave (move) in a certain manner before arriving at the image forming apparatus 1. For example, in a case of obtaining a superior's signature on a document and making a photocopy of the document with the signature thereon, the carrying user moves along a route from his/her own desk→the superior's desk→the image forming apparatus 1. Further, in making a photocopy of the document with the signature thereon, a set value to be set on the image forming apparatus 1 may be predetermined. A set value desired by a user may be predictable depending on a movement route he/she takes.

With these in view, the image forming apparatus 1 according to the embodiment includes the communication unit 15, the storage unit 11, and the control unit 10. The communication unit 15 communicates with the portable communication device 2. The storage unit 11 stores the present set value information 9 and the setting information 6. The control unit 10 performs control so that a job is performed based on the present set value information 9. The present set value information 9 is data indicating a set value of each setting item presently set for a job about to be executed. The setting information 6 includes the set value data 7 and the route data 8. The set value data 7 indicates a set value of each setting item for a job that has been executed. The route data 8 indicates a movement route taken, when a job corresponding to the set value data 7 is executed, by the portable communication device 2 until communication with the communication unit 15 is enabled. When communication with the portable communication device 2 has been enabled, the communication unit 15 acquires present route information from the portable communication device 2. The present route information indicates a movement route taken this time by a carrying user carrying the portable communication device 2 until communication with the image forming apparatus 1 is enabled. When the communication unit 15 has acquired the present route information, the control unit 10 extracts, from the setting information 6 stored in the storage unit 11, a piece of setting information 6 in which the route data 8 is identical to the present route information thus acquired. The control unit 10 controls the storage unit 11 to update the present set value information 9 so as to reproduce the set value defined by the set value data 7 included in the piece of setting information 6 thus extracted.

Thus, a set value corresponding to a movement route (a behavior pattern) of the carrying user can be automatically set. Based on a movement route to arrive at the image forming apparatus 1, a set value highly likely to be set by the carrying user can be automatically set. A set value to be set on the image forming apparatus 1 can be automatically set so as to increase the probability of being able to start a job without performing a setting operation.

The image forming apparatus 1 includes the camera 17 for photographing the carrying user. When the communication unit 15 has become communicable with the portable communication device 2, the control unit 10 controls the camera 17 to photograph the carrying user. Based on photographing data obtained through photographing, the control unit 10 determines an article held by the carrying user. When a plurality of pieces of setting information 6 have been extracted, the control unit 10 further extracts, from the primary extraction information, which is the extracted pieces of setting information 6, a piece of setting information 6 corresponding to a job that is performed using the held article. The control unit 10 controls the storage unit 11 to update the present set value information 9 so as to reproduce set values defined by the set value data 7 included in the secondary extraction information, which is the piece of setting information 6 further extracted from the primary extraction information. Thus, it is possible to determine the article held by the carrying user who has approached the image forming apparatus 1. Based on the held article, a piece of set value data 7 (setting information 6) highly likely to be set by the carrying user can be further narrowed down. A piece of setting information 6 can be automatically narrowed down.

In a case where the carrying user is holding a sheet(s) of paper, it is highly likely that the sheet(s) of paper is an original document to be used (read) in a job. The image forming apparatus 1 includes the image reading unit 13 that reads an original document. Based on photographing data, the control unit 10 determines whether or not a held article is a sheet(s) of paper. Upon determining that the held article is a sheet(s) of paper, the control unit 10 extracts, from the primary extraction information, a piece of setting information 6 corresponding to a job using the image reading unit 13 as the secondary extraction information. Thus, it is possible to determine whether or not the article held by the carrying user who has approached the image forming apparatus 1 is a sheet(s) of paper. When the held article is a sheet(s) of paper, it is highly likely that a job involving reading of an original document is to be performed. When the held article is a sheet(s) of paper, the piece of setting information 6 corresponding to the job using the image reading unit 13 can be automatically selected. It is possible to select only a piece of set value data 7 (setting information 6) corresponding to a set value the carrying user wishes to set. It is possible to further increase the probability of being able to start a job without performing a setting operation.

The image forming apparatus 1 includes the memory interface 16 for connecting the portable memory 3 thereto and performing reading and writing with respect to the portable memory 3. Based on photographing data, the control unit 10 determines whether or not a held article is the portable memory 3. Upon determining that the held article is the portable memory 3, the control unit 10 extracts, from the primary extraction information, a piece of setting information 6 corresponding to a job using the portable memory 3 as the secondary extraction information. Thus, it is possible to determine whether or not the article held by the carrying user who has approached the image forming apparatus 1 is the portable memory 3. When the held article is the portable memory 3, it is highly likely that a job using the portable memory 3 is to be performed. When the held article is the portable memory 3, the piece of setting information 6 corresponding to the job using the portable memory 3 can be automatically selected. It is possible to select only a piece of setting information 6 corresponding to a set value the carrying user wishes to set. It is possible to further increase the probability of being able to start a job without performing a setting operation.

The image forming apparatus 1 includes the operation panel 12. The operation panel 12 includes the display panel 12a and accepts an operation. The control unit 10 controls the display panel 12a to display the selection screen S1 for selecting a piece of setting information 6 to be used. When a plurality of pieces of primary extraction information have been extracted and determination of a held article has failed, the selection screen S1 is a screen for selecting, from among the plurality of pieces of primary extraction information, a piece of setting information 6 to be used. When a plurality of pieces of secondary extraction information have been extracted, the selection screen S1 is a screen for selecting, from among the plurality of pieces of secondary extraction information, a piece of setting information 6 to be used. The control unit 10 controls the storage unit 11 to update the present set value information 9 so as to reproduce set values defined by the set value data 7 included in the piece of setting information 6 thus selected on the selection screen S1. Thus, when a piece of setting information 6 cannot be narrowed down by using the image forming apparatus 1 alone, the carrying user himself/herself can select the piece of setting information 6 (set value data 7). It is possible to set a desired set value simply by selecting a piece of setting value data 7.

The control unit 10 controls the display panel 12a to display set values set based on the set value data 7 included in the piece of setting information 6 selected on the selection screen S1. Set values set based on the set value data 7 can be checked.

Upon execution of a job, the control unit 10 checks whether or not the storage unit 11 stores the identical information that is a piece of setting information 6 in which the route data 8 is identical to the present route information and the set value data 7 is identical to a piece of present set value information 9 corresponding to the job that has been executed. When the identical information is stored, the control unit 10 adds a value to the use frequency value 6a assigned to the identical information. When a plurality of pieces of primary extraction information have been extracted and determination of a held article has failed or when a plurality of pieces of secondary extraction information have been extracted, the control unit 10 sets an order of priority for the extracted pieces of setting information 6 so that a higher priority is given to a piece of setting information 6 with a larger value of the use frequency value 6a. The control unit 10 selects, as display candidates, a plurality of pieces of setting information 6 in a descending order of priority. The control unit 10 controls the selection screen S1 to display contents of the set value data 7 included in each of the pieces of setting information 6 thus selected as the display candidates. Thus, as display candidates, most frequently used pieces of setting information 6 can be selected from among pieces of setting information 6 corresponding to a movement route (a behavior pattern) of the carrying user. Through learning of a behavior of the carrying user, it is possible to select, as display candidates, pieces of setting information 6 adapted to a movement route.

When no identical information is stored, the control unit 10 controls the storage unit 11 to newly store a piece of setting information 6 including the present route information as the route data 8 and the present set value information 9 as the set value data 7. Thus, a combination of a new movement route and a new piece of set value data 7 (a new piece of setting information 6) can be automatically registered in the image forming apparatus 1.

The operation panel 12 accepts a switching operation for switching a piece of setting information 6 to be used. Upon the switching operation being performed, the control unit 10 controls the storage unit 11 to update the present set value information 9 so as to reproduce set values defined by the set value data 7 included in a piece of setting information 6 that has been newly selected through the switching operation. Thus, in a case of an erroneous selection of a piece of setting information 6 (set value data 7), switching to a correct piece of set value data 7 can be easily performed. A desired piece of set value data 7 can be easily selected.

The image forming system 100 includes the image forming apparatus 1 and the portable communication device 2 that are mentioned above. When communication with the communication unit 15 has been enabled, the portable communication device 2 transmits the present route information to the communication unit 15. By this configuration, simply by approaching the image forming apparatus 1 while holding the portable communication device 2, a set value to be set on the image forming apparatus 1 can be automatically set. Based on a movement route to arrive at the image forming apparatus 1, a set value the carrying user highly likely wishes to set can be automatically set. There can be provided the image forming system 100 that has a high probability of being able to start a job in the image forming apparatus 1 without performing a setting operation.

MODIFICATION EXAMPLE

The above-mentioned image forming system 100 has been described using, an example, a case where the image forming apparatus 1 mainly performs processing for setting a set value based on a movement route. Specifically, in the described example, the image forming apparatus 1 stores the setting information 6 and extracts a piece of setting information 6 therefrom based on the present route information from the portable communication device 2. A configuration may also be adopted in which the portable communication device 2 performs the processing to be performed by the image forming apparatus 1. A modification example describes an example in which the portable communication device 2 stores the setting information 6 and extracts a piece of setting information 6 therefrom based on the present route information. In the modification example, the image forming apparatus 1 does not perform storage of the setting information 6 and extraction of a piece of setting information 6 based on the present route information.

(Portable Communication Device 2)

Next, with reference to FIG. 3, a description is given of one example of a portable communication device 2 according to the modification example. Similarly to the portable communication device 2 according to the embodiment, the portable communication device 2 according to the modification example includes a processing unit 20, an information storage unit 21, a display 22, a touch panel 23, an audio processing unit 24, a microphone 25, a reproduction processing unit 26, a speaker 27, and a wireless communication unit 28. A similar description to that of the portable communication device 2 according to the embodiment can be applied to the portable communication device 2 according to the modification example. The same description is applied for like elements, and the following description is directed to elements different from those in the portable communication device 2 according to the embodiment.

In the portable communication device 2 according to the modification example, an automatic setting application 210 is installed in the information storage unit 21. The automatic setting application 210 is an application for performing processing related to automatic setting in an image forming apparatus 1 when a carrying user has approached the image forming apparatus 1. The automatic setting application 210 is not installed (not required to be installed) in the information storage unit 21 of the portable communication device 2 according to the embodiment.

Furthermore, in place of the image forming apparatus 1, the information storage unit 21 of the portable communication device 2 according to the modification example stores the setting information 6. The image forming apparatus 1 according to the modification example is not required to store the setting information 6. Furthermore, the information storage unit 21 of the portable communication device 2 according to the embodiment is not required to store the setting information 6.

(Image Forming Apparatus 1)

Next, with reference to FIG. 2, a description is given of one example of the image forming apparatus 1 according to the modification example. Similarly to the image forming apparatus 1 according to the embodiment, the image forming apparatus 1 according to the modification example includes a control unit 10, a storage unit 11, an operation panel 12, an image reading unit 13, a printing unit 14, a communication unit 15, a memory interface 16, and a camera 17 (see FIG. 2). A similar description to that of the image forming apparatus 1 according to the embodiment can be applied to the image forming apparatus 1 according to the modification example. As described with reference to FIG. 4, the image forming apparatus 1 according to the modification example is also capable of determining an article held by a carrying user. An portable communication device according to the modification example, however, performs part of the processing to be performed by the image forming apparatus 1 according to the embodiment in place thereof (this will be detailed later).

(Storage of Movement History Data 5)

The portable communication device 2 according to the modification example also stores the movement history data 5. Similarly to the portable communication device 2 according to the embodiment, the portable communication device 2 according to the modification example also performs the processing shown in FIG. 5.

(Accumulation of Setting Information 6)

Figure 13:
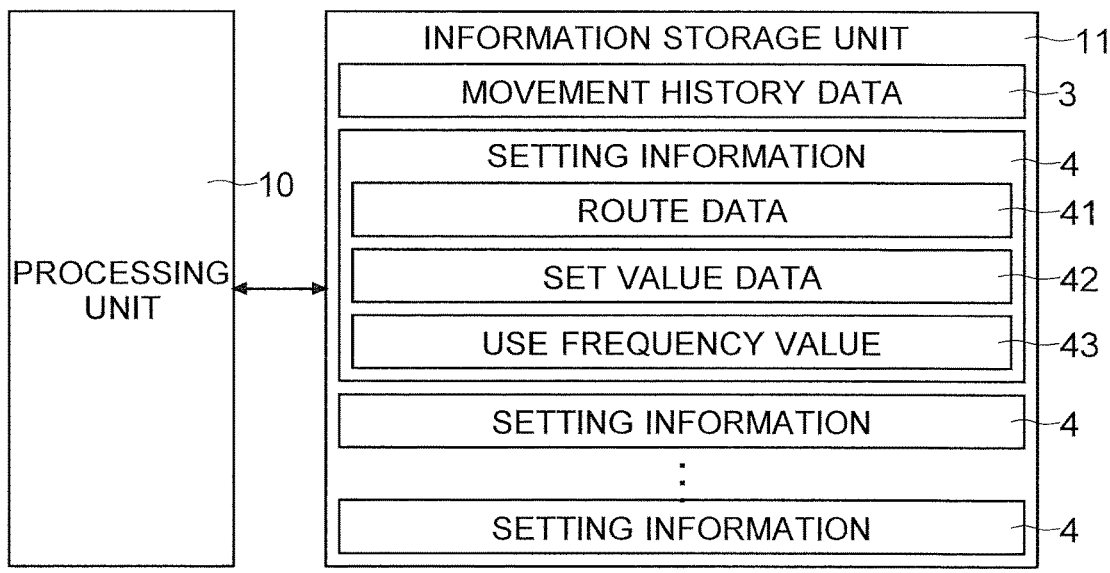
FIG. 13 is a view showing one example of data stored in the portable communication device according to the modification example.
Figure 14:
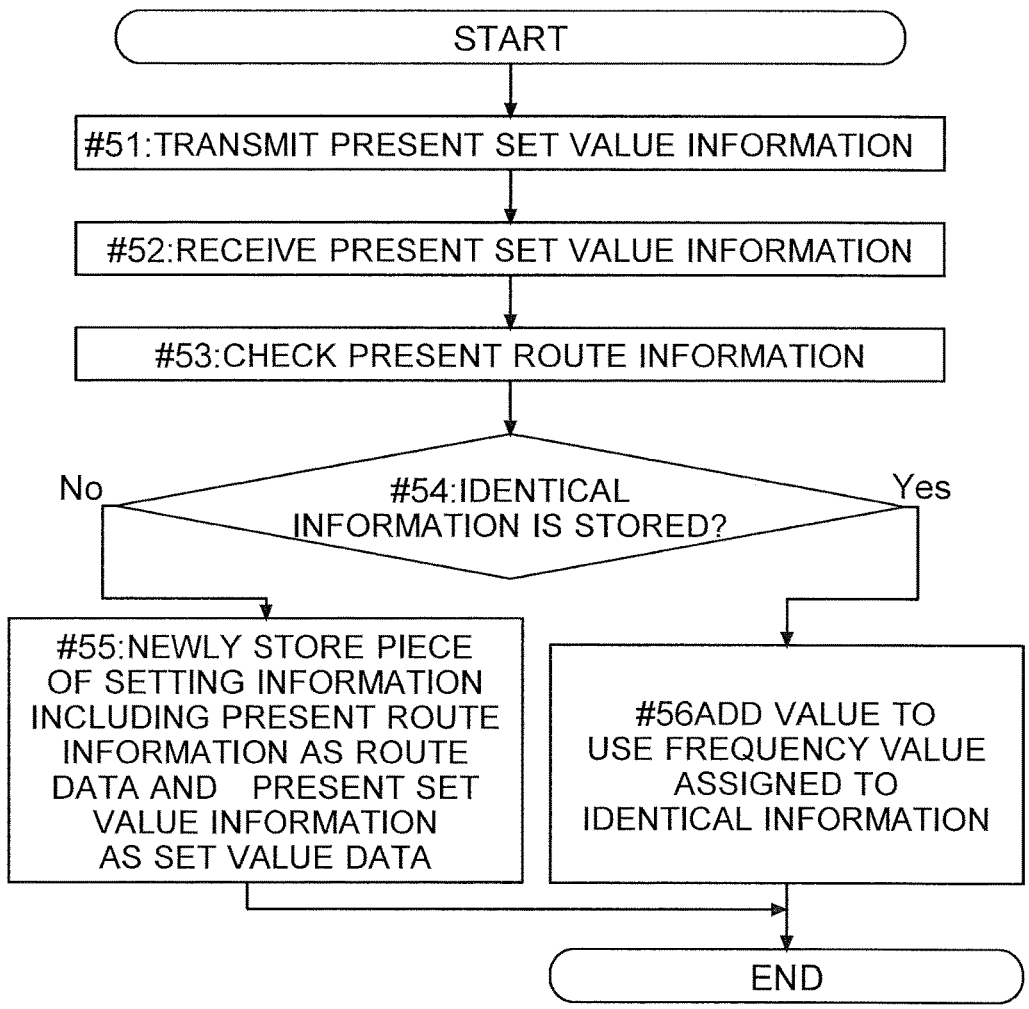
FIG. 14 is a view showing one example of a flow of accumulation of setting information by the portable communication device according to the modification example.

Next, with reference to FIG. 5, FIG. 13, and FIG. 14, a description is given of one example of accumulation of the setting information 6 in an image forming system 100 according to the modification example. In order to learn a type of a job corresponding to a movement route and a set value therefor, the processing unit 20 causes the information storage unit 21 to accumulate the setting information 6. The information storage unit 21 can store a plurality of pieces of setting information 6 in a non-volatile manner. With reference to FIG. 5 and FIG. 14, a description is given of one example of a flow of accumulation of the setting information 6.

The storage unit 11 of the image forming apparatus 1 stores the present set value information 9 (see FIG. 2). For example, the control unit 10 performs control so that the present set value information 9 is stored in a particular region of the RAM 11*a*. The present set value information 9 is data indicating a present set value. The control unit 10 performs control so that all set values of setting items corresponding to a job of a selected type are stored as the present set value information 9.

In FIG. 14, START corresponds to a point in time when a carrying user has approached the image forming apparatus 1 and causes the image forming apparatus 1 to start executing a job. Here, prior to execution of the job, the carrying user has selected beforehand a required setting item and set a set value thereof. Furthermore, in the portable communication device 2, the automatic setting application 210 has been activated. Based on the automatic setting application 210, the processing unit 20 performs processing for accumulating the setting information 6.

Here, the storage unit 11 stores the default set value data 9a in a non-volatile manner (see FIG. 2). The default set value data 9a is data defining default set values of various setting items. When a type of the job has been selected, the control unit 10 reads out a corresponding piece of default set value data 9a. Then, the control unit 10 uses, as the present set value information 9, the piece of default set value data 9a thus read out. At the initial start of setting, set values of all setting items are set to default values. When any of the set values has been changed, the control unit 10 updates the present set value information 9. The control unit 10 writes a changed set value into the present set value information 9. A similar description to that of the image forming apparatus 1 according to the embodiment apply in these respects.

When all set values are set as desired, the carrying user issues a job execution start instruction to start executing the job. For example, the carrying user operates a start key of the operation panel 12. The operation panel 12 accepts the job execution start instruction. Thus, the image forming apparatus 1 (the control unit 10) starts executing the job.

The control unit 10 (the image forming apparatus 1) controls the communication unit 15 to transmit, to the portable communication device 2 (the wireless communication unit 28), a piece of present set value information 9 corresponding to the job whose execution has been started (step #51). In this case, the piece of present set value information 9 is data indicating a set value of each setting item for the job whose execution has been started. Furthermore, the control unit 10 includes data indicating the type of the job whose execution has been started in the piece of present set value information 9. The wireless communication unit 28 receives the piece of present set value information 9 (step #52). The fact that the carrying user has issued a job execution instruction on the operation panel 12 implies that the carrying user (the portable communication device 2) is in proximity to the image forming apparatus 1. That is, the portable communication device 2 is in a state of being communicable with the image forming apparatus 1.

At the start of the job, a person different from a job executor may, by accident, pass by near the image forming apparatus 1. With this in view, a configuration may be adopted in which, upon reception of a piece of present set value information 9, the processing unit 20 checks whether or not the piece of present set value information 9 received is data addressed to the self portable communication device 2 (i.e. the portable communication device 2 to which it belongs). When a length of time from when communication with the image forming apparatus 1 is enabled to when the piece of present set value information 9 is received is less than a determination reference time, the processing unit 20 may determine that the set value data 7 is not addressed to the self portable communication device 2. When the length of time from when communication with the image forming apparatus 1 is enabled to when the piece of present set value information 9 is received exceeds the determination standard time, the processing unit 20 may determine that the set value data 7 is addressed to the self portable communication device 2. The determination standard time is set as appropriate. The determination standard time can be set to, for example, 1 to several seconds. When it has been determined that the piece of present set value information 9 is not addressed to the self portable communication device 2, the processing unit 20 discards the received piece of present set value information 9.

Furthermore, the control unit 10 acquires a piece of identification information for identifying the portable communication device 2 wirelessly communicable with the communication unit 15. In other words, the control unit 10 acquires a piece of identification information for identifying the portable communication device 2 that has entered a communicable area of the communication unit 15. Furthermore, while the portable communication device 2 is in the communicable area, the control unit 10 periodically acquires the piece of identification information.

In this case, when there is only one portable communication device 2 in the communicable area of the communication unit 15, the control unit 10 determines that the portable communication device 2 in the communicable area is the one held by the job executor. When there are a plurality of portable communication devices 2 in the communicable area of the communication unit 15, the control unit 10 determines that one of the plurality of portable communication devices 2 that has been in the communicable are for the longest time is the one held by the job executor. Any other algorithm may be used to determine the portable communication device 2 held by the job executor.

Then, the control unit 10 may control the communication unit 15 to transmit, as data indicating a destination, a piece of identification information for indicating the portable communication device 2 that has been determined as being held by the job executor. When a piece of identification information assigned to a piece of present set value information 9 agrees with a piece of identification information for identifying the self portable communication device 2, the processing unit 20 may determine that the piece of present set value information 9 received is addressed to the self portable communication device 2. When the piece of identification information assigned to the piece of present set value information 9 is different from the piece of identification information for identifying the self portable communication device 2, the processing unit 20 may determine that the piece of present set value information 9 received is not addressed to the self portable communication device 2.

Upon receipt of a piece of present set value information 9, the processing unit 20 of the portable communication device 2 checks the present route information (step #53). The present route information is data indicating a movement route taken by the carrying user until communication with the image forming apparatus 1 is enabled. The present route information is data based on the movement history data 5. A piece of identification information for identifying the image forming apparatus 1 has been pre-registered in the information storage unit 21.

The processing unit 20 generates the present route information. The processing unit 20 excerpts, from the movement history data 5, sequential pieces of identification information for identifying a prescribed number of wireless devices 4 as the present route information. The prescribed number is set as appropriate. For example, the prescribed number can be set to several to a dozen or so. In the present route information, a chronologically last one of the pieces of identification information is a piece of identification information for identifying one of the wireless devices 4 that has become communicable immediately before the image forming apparatus 1 does. In other words, the processing unit 20 uses, as the present route information, pieces of identification information for identifying a prescribed number of wireless devices 4 arranged in reverse chronological order from one of the wireless devices 4 that has become communicable most recently.

Next, the processing unit 20 checks whether or not the information storage unit 21 stores identical information (step #54). The identical information is a piece of setting information 6 in which the route data 8 is identical to the present route information and the set value data 7 is identical to the piece of present set value information 9 received. At step #54, it is checked whether or not a job that is identical in movement route and equal in set value to the job executed this time has ever been executed in the past.

When no identical information is stored (No at step #54), the processing unit 20 (the portable communication device 2) causes the information storage unit 21 to newly store a piece of setting information 6 that includes the present route information as the route data 8 and the received piece of present set value information 9 as the set value data 7 (step #55). Then, the control unit 10 ends this flow (END). Thus, a movement pattern of the carrying user and a set value for a job corresponding to the movement pattern are accumulated.

When the identical information is stored (Yes at step #54), the processing unit 20 (the portable communication device 2) adds a value to the use frequency value 6a assigned to the identical information (step #56). Then, the control unit 10 ends this flow (END). Each piece of setting information 6 includes the use frequency value 6. For example, the processing unit 20 adds 1 to the use frequency value 6a of a piece of setting information 6 that has been determined to be the identical information. It is possible to learn, based on the use frequency value 6a, a combination of frequently used set values with respect to a certain movement route.

(Transmission of Set Value Data 7 from Portable Communication Device 2 to Image Forming Apparatus 1)

Figure 15:
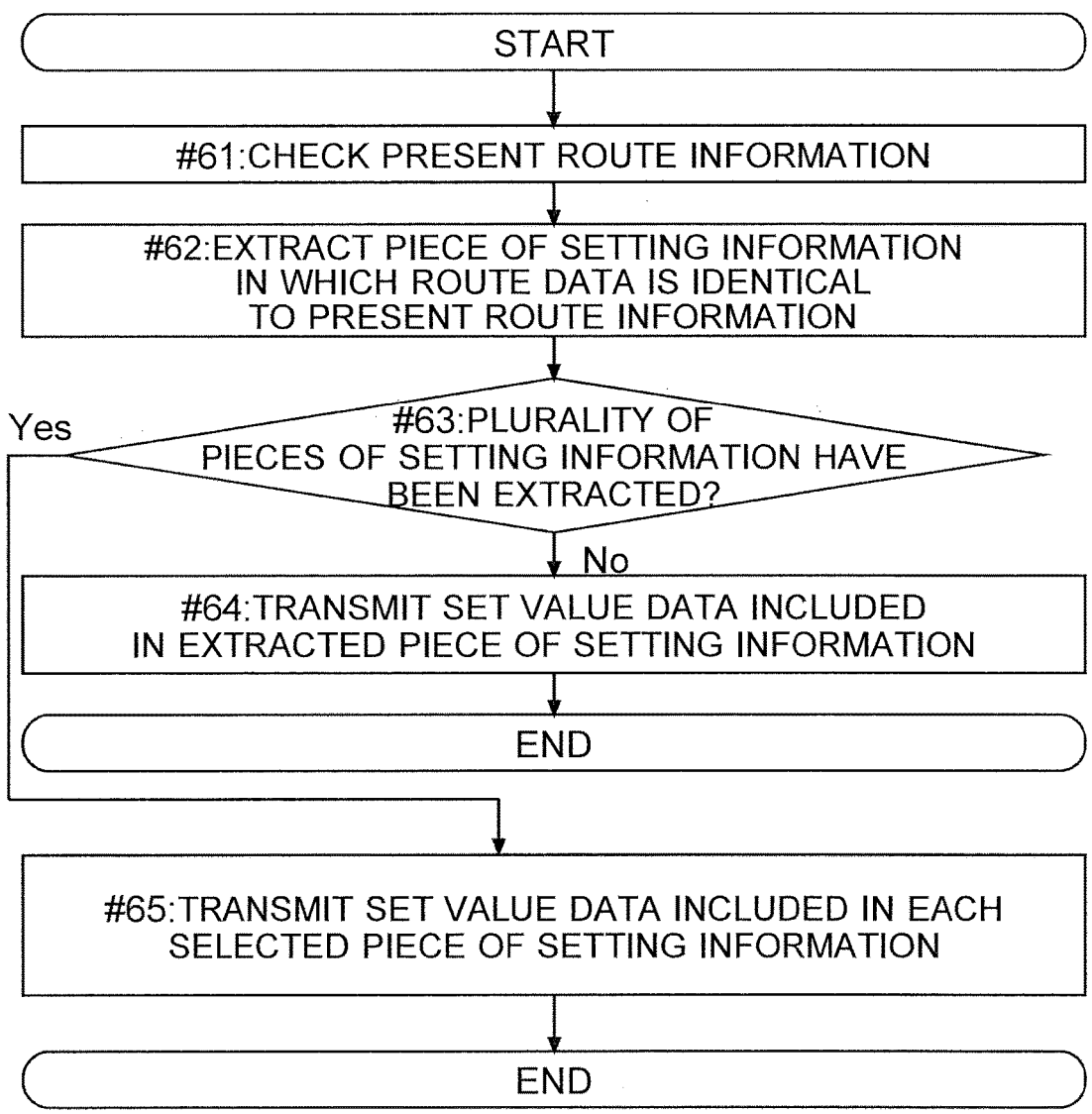
FIG. 15 is a flow chart showing one example of a flow of transmission of set value data from the portable communication device to the image forming apparatus according to the modification example.

Next, with reference to FIG. 15, a description is given of one example of a flow of transmission of the set value data 7 from the portable communication device 2 to the image forming apparatus 1 according to the modification example. When desiring that the image forming apparatus 1 execute a job, a carrying user approaches the image forming apparatus 1. In FIG. 15, START corresponds to a point in time when the portable communication device 2 becomes communicable with the image forming apparatus 1. In other words, this is a point in time when the portable communication device 2 enters a communicable area of the image forming apparatus 1. Furthermore, in the portable communication device 2, the automatic setting application 210 has been activated. Based on the automatic setting application 210, the processing unit 20 transmits the set value data 7.

When the carrying user has approached the image forming apparatus 1 and thus communication with the image forming apparatus 1 has been enabled, the processing unit 20 checks the present route information (step #61). Then, the processing unit 20 extracts, from the setting information 6 stored in the information storage unit 21, a piece of setting information 6 in which the route data 8 is identical to the present route information (step #62).

Then, the processing unit 20 checks whether or not there are a plurality of extracted pieces of setting information 6 (step #63). When there is one extracted piece of setting information 6 (No at step #63), the processing unit 20 causes the wireless communication unit 28 to transmit, to the image forming apparatus 1 (the communication unit 15), the set value data 7 included in the extracted piece of setting information 6 (step #64). Then, the control unit 10 ends this flow (END).

When there are a plurality of extracted pieces of setting information 6 (Yes at step #63), the processing unit 20 causes the wireless communication unit 28 to transmit, to the image forming apparatus 1 (the communication unit 15), the set value data 7 included in each of the extracted pieces of setting information 6 (step #65). That is, the processing unit 20 causes a plurality of pieces of set value data 7 to be transmitted. The processing unit 20 causes the user frequency value 6a to be also transmitted together with the set value data 7. Then, the control unit 10 ends this flow (END).

When a plurality of pieces of setting information 6 have been extracted, the processing unit 20 may transmit only the set value data 7 included in one of the plurality of pieces of setting information 6 that has a largest value of the use frequency value 6a. In a case where there are a plurality of pieces of setting information 6 that have a largest value of the use frequency value 6a, the processing unit 20 transmits a plurality of pieces of the set value data 7 included therein to the image forming apparatus 1.

Furthermore, when a plurality of pieces of setting information 6 have been extracted, the processing unit 20 may select a preset number of pieces of setting information 6 in order from one of the plurality of pieces of setting information 6 that has a largest value of the use frequency value 6a. Then, the processing unit 20 may cause the wireless communication unit 28 to transmit the set value data 7 included in each of the thus selected pieces of setting information 6. Furthermore, the processing unit 20 may be configured not to transmit the set value data 7 included in, among the extracted pieces of setting information 6, a piece of setting information 6 that has a value of the use frequency value 6a less than a prescribed value.

(Setting of Set Value Based on Set Value Data 7)

Figure 16:
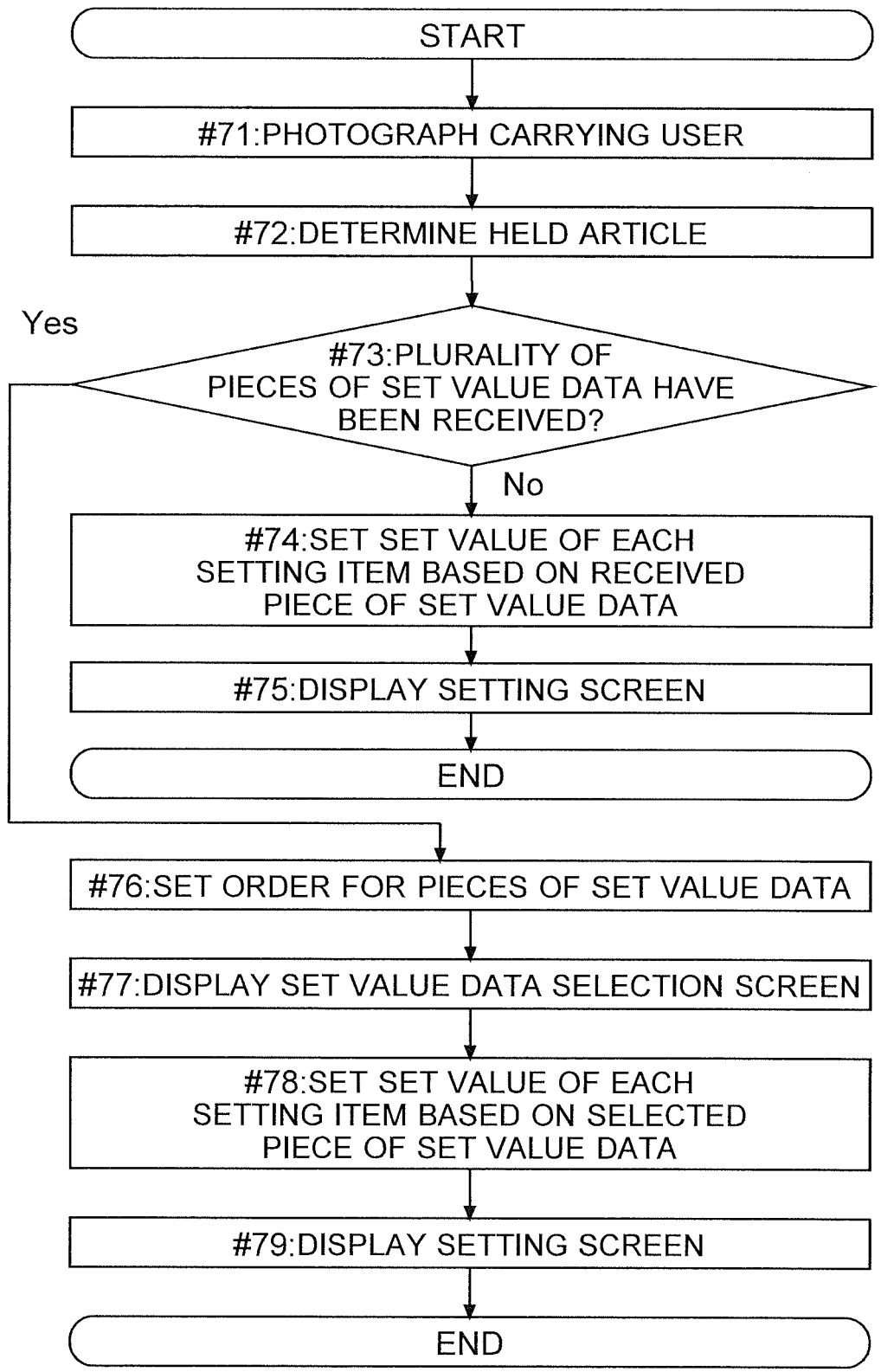
FIG. 16 is a view showing one example of a flow of processing performed upon reception of set value data in the image forming apparatus according to the modification example.

Next, with reference to FIG. 16 and FIG. 11, a description is given of one example of a flow of processing performed upon receipt of the set value data 7 in the image forming apparatus 1 according to the modification example. In FIG. 16, START corresponds to a point in time when the image forming apparatus 1 (the communication unit 15) receives the set value data 7 from the portable communication device 2 (the wireless communication unit 28) that has become communicable therewith. First, the control unit 10 controls the camera 17 to photograph a carrying user approaching the image forming apparatus 1 (step #71). Then, based on photographing data obtained through photographing, the control unit 1 determines a held article (step #72).

Subsequently, the control unit 10 checks whether or not a plurality of pieces of set value data 7 have been received (step #73). When there is one received piece of set value data 7 (No at step #73), based on the received piece of set value data 7, the control unit 10 (the image forming apparatus 1) sets a set value of each setting item (step #74). Specifically, the control unit 10 rewrites the present set value information 9 stored in the storage unit 11. The control unit 10 writes the received piece of set value data 7 into a storage region of the present set value information 9. Thus, a setting state of a previously executed job is reproduced. Then, the control unit 10 controls the display panel 12a to display a setting screen (step #75→END).

The control unit 10 controls the display panel 12a to display a setting screen for a type of a job corresponding to the received piece of set value data 7. For example, when the received piece of set value data 7 is a piece of set value data 7 corresponding to a copy job, the control unit 10 controls the display panel 12a to display a setting screen for the copy job. Furthermore, the control unit 10 controls the display panel 12a to display a setting screen in which set values defined by the received piece of set value data 7 are reflected. In order to show set values that have been set, the control unit 10 may control the display panel 12a to display a list of set values different from default values. Thus, the carrying user who has come to the image forming apparatus 1 can be notified of contents that have been set.

When there are a plurality of received pieces of set value data 7 (Yes at step #73), the control unit 10 sets an order for the pieces of set value data 7 (step #76). Based on the use frequency value 6a, the control unit 10 sets the order for the pieces of set value data 7. The control unit 10 sets the order for the received pieces of set value data 7 so that a piece of set value data 7 with a larger value of the use frequency value 6a comes earlier in the order.

A plurality of pieces of set value data 7 that are equal in value of the use frequency value 6a may be received. In this case, based on a held article determined, the control unit 10 sets an order for the pieces of set value data 7. When it has been determined that a sheet(s) of paper is held, the control unit 10 sets the order so that a job involving reading of an original document comes earlier in the order than a job not involving reading of an original document. The job involving reading of an original document is, for example, a copy job, a scan transmission job, or a scan storage job. Examples of the job not involving reading of an original document include a memory connection printing job. For example, in a case where the copy job and the memory connection printing job are equal in value of the use frequency value 6a in respective pieces of set value data 7, the piece of set value data 7 corresponding to the copy job is set to come earlier in the order.

When it has been determined that a portable memory is held, the control unit 10 sets the order so that a job using the portable memory comes earlier in the order than a job not using the portable memory. Examples of the job using the portable memory include a memory connection printing job. For example, in a case where the copy job and the memory connection printing job are equal in value of the use frequency value 6a in respective pieces of set value data 7, the memory connection printing job is set to come earlier in the order.

When it cannot be determined that a sheet(s) of paper is held and it cannot be determined that the portable memory is held, the control unit 10 sets an order for pieces of set value data 7 that are equal in value of the use frequency value 6a based on an order in which they are received.

Furthermore, when a plurality of pieces of set value data 7 have been received, based on a held article determined, the control unit 10 may first sort out the pieces of set value data 7. When it has been determined that a sheet(s) of paper is held, the control unit 10 handles, as a prioritized piece of set value data 7, a piece of set value data 7 corresponding to a job involving reading of an original document. Furthermore, the control unit 10 handles, as a non-prioritized piece of set value data 7, a piece of set value data 7 corresponding to a job not involving reading of an original document. When it has been determined that the portable memory is held, the control unit 10 handles, as the prioritized piece of set value data 7, a piece of set value data 7 corresponding to a job using the portable memory. Furthermore, the control unit 10 handles, as the non-prioritized piece of set value data 7, a piece of set value data 7 corresponding to a job not using the portable memory.

The control unit 10 sets an order so that the prioritized piece of set value data 7 comes earlier in the order than the non-prioritized piece of set value data 7. Moreover, the control unit 10 sets an order for prioritized pieces of set value data 7 so that a piece of set value data 7 with a larger value of the use frequency value 6a comes earlier in the order. When the number of the prioritized pieces of set value data 7 is n, the control unit 10 sets an order for the prioritized pieces of set value data 7 by assigning numbers 1 to n thereto, respectively. The control unit 10 sets an order for non-prioritized pieces of set value data 7 by assigning numbers starting from (n+1) thereto, respectively. The control unit 10 sets the order for the non-prioritized pieces of set value data 7 so that a piece of set value data 7 with a larger value of the use frequency value 6a comes earlier in the order.

The control unit 10 (the image forming apparatus 1) controls the display panel 12a to display a selection screen S1 (step #77). The selection screen S1 according to the modification example is similar to that according to the embodiment (see FIG. 11). The selection screen S1 is a screen for allowing the carrying user to select a piece of set value data 7 to be used.

The selection screen S1 is divided into a plurality of regions. In the example shown in FIG. 11, two of the plurality of regions of the thus divided selection screen S1 are each used as a selection region F1. The selection region F1 is a region for selecting a piece of set value data 7. The number of the selection regions F1 is not limited to two. Three or more selection regions F1 may be provided.

The control unit 10 selects pieces of set value data 7 that come first and second in the order. The control unit 10 selects a number of pieces of set value data 7 equal to the number of the selection regions F1. The control unit 10 selects the plurality of pieces of set value data 7, starting from the earliest one in the order. The control unit 10 allocates each of the selection regions F1 to one of the pieces of set value data 7 thus selected in one-to-one correspondence with each other. The control unit 10 performs control so that contents of a corresponding one of the pieces of set value data 7 are displayed within the each of the selection regions F1.

A user (the carrying user) touches one of the selection regions F1 that corresponds to a piece of set value data 7 he/she wishes to use. The operation panel 12 accepts a selection of the piece of set value data 7. Based on an output of the touch panel 23, the control unit 10 recognizes the piece of set value data 7 thus selected. Thus, when there are a plurality of patterns of frequently-set set values with respect to a movement route (a movement pattern), a desired piece of set value data 7 can be selected.

Then, based on the piece of set value data 7 selected on the operation panel 12, the control unit 10 (the image forming apparatus 1) sets a set value of each setting item (step #78). Then, the control unit 10 controls the display panel 12a to display a setting screen (step #79→END). Step #78 and step #79 are performed in a similar manner to step #74 and step #75, respectively.

When desired set values have been set after setting at step #74 and step #78, a job can be started immediately. The carrying user could immediately operate the start key. When there is a need to change any set value, the carrying user performs setting of the set value on the operation panel 12. After completing the setting, the carrying user operates the start key.

(Switching of Piece of Set Value Data 7 to be Used)

Next, with reference to FIG. 12, a description is given of one example of switching of a piece of set value data 7 to be used. Similarly to the embodiment, also in the image forming apparatus 1 according to the modification example, switching of a piece of set value data 7 to be used can be performed. When switching a piece of set value data 7 to be used, a carrying user performs a switching operation. The operation panel 12 accepts the switching operation. The switching operation according to the modification example is similar to that in the embodiment. FIG. 12 shows an example in which a background region (a region including no operation image) of a setting screen is moved in a sliding manner, and this operation (a flick operation or a swipe operation) is handled as the switching operation.

When the switching operation has been performed so that a touch position is moved in a first direction, the control unit 10 newly selects, from among pieces of set value data 7 arranged in order, a piece of set value data 7 that comes next to a presently selected piece of set value data 7 in that order. When the switching operation has been performed so that a touch position is moved in a second direction, the control unit 10 newly selects, from among the pieces of set value data 7 arranged in order, a piece of set value data 7 that immediately precedes the presently selected piece of set value data 7 in that order.

When the new piece of set value data 7 has been selected through the switching operation, based on the newly selected piece of set value data 7, the control unit 10 sets a set value of each setting item. The control unit 10 handles the newly selected piece of set value data 7 as the present set value information 9. The control unit 10 controls the display panel 12a to display a setting screen for a type of a job corresponding to the newly selected piece of set value data 7.

As shown in FIG. 12, also in the image forming apparatus 1 according to the modification example, set values and a setting screen are changed as a result of the setting operation.

The image forming system 100 according to the modification example includes the portable communication device 2 and the image forming apparatus 1. The portable communication device 2 stores the setting information 6 and the movement history data 5 indicating a history of movement of a carrying user carrying the portable communication device 2. The setting information 6 is data that is a combination of the route data 8 and the set value data 7. The route data 8 indicates, on the image forming apparatus 1, a movement route taken, when the carrying user executes a job on the image forming apparatus 1, by the carrying user until arrival at the image forming apparatus 1. The set value data 7 indicates a set value of each setting item for a job. The portable communication device 2 wirelessly communicates with the image forming apparatus 1. When the carrying user has approached the image forming apparatus 1 and thus the portable communication device 2 has entered a communicable area where communication with the image forming apparatus 1 is enabled, based on the movement history data 5, the portable communication device 2 checks the present route information indicating a movement route taken by the carrying user until communication with the image forming apparatus 1 is enabled. The portable communication device 2 extracts, from the setting information 6 stored therein, a piece of setting information 6 in which the route data 8 is identical to the present route information. The portable communication device 2 transmits, to the image forming apparatus 1, the set value data 7 included in the piece of setting information 6 thus extracted. The portable communication device 2 causes the image forming apparatus 1 to set the set value of each setting item based on the set value data 7 thus transmitted.

Thus, a set value corresponding to a movement route (a behavior pattern) of a carrying user can be automatically set. Based on a movement route to arrive at the image forming apparatus 1, a set value the carrying user highly likely wishes to set can be automatically set. A set value to be set on the image forming apparatus 1 can be automatically set so as to increase the probability of being able to start a job without performing a setting operation.

Furthermore, when a job has been executed after reception of the set value data 7, the image forming apparatus 1 transmits the present set value information 9 to the portable communication device 2. The present set value information 9 is data indicating a set value of each setting item for the job that has been executed. Upon reception of the present set value information 9, the portable communication device 2 checks whether or not there is stored identical information that is a piece of setting information 6 in which the route data 8 is identical to the present route information and the set value data 7 is identical to the present set value information 9 thus received. When the identical information is stored, the portable communication device 2 adds a value to the use frequency value 6a assigned to the identical information. When communication with the image forming apparatus 1 has been enabled, the portable communication device 2 transmits, to the image forming apparatus 1, the use frequency value 6a included in each of extracted pieces of setting information 6. Based on one of pieces of set value data 7 that has a largest value of the use frequency value 6a, the portable communication device 2 causes the image forming apparatus 1 to set the set value of each setting item.

Thus, based on a combination of most frequently used set values among set values defined by a piece of set value data 7 corresponding to a movement route (a behavior pattern) of a carrying user, settings can be automatically made with respect to the image forming apparatus 1. Through learning of a behavior of the carrying user, a set value adapted to a movement route can be automatically set. The image forming apparatus 1 can be automatically brought into a state where highly frequently used set values are set. A set value can be automatically set so as to increase the probability of being able to start a job without performing a setting operation in the image forming apparatus 1.

Furthermore, when no identical information is stored, the portable communication device 2 newly stores a piece of setting information 6 including the present route information as the route data 8 and the present set value information 9 thus received as the set value data 7. Thus, a combination of a new movement route and a new piece of set value data 7 (a new piece of setting information 6) can be automatically registered in the portable communication device 2.

Furthermore, when a plurality of pieces of setting information 6 that include the route data 8 identical to the present route information are stored, the portable communication device 2 extracts the plurality of pieces of setting information 6. The portable communication device 2 transmits, to the image forming apparatus 1, the set value data 7 included in each of the plurality of pieces of setting information 6 thus extracted. The image forming apparatus 1 includes the operation panel 12. Upon receipt of a plurality of pieces of set value data 7, the image forming apparatus 1 causes the operation panel 12 to display a screen for selecting a piece of set value data 7 to be used. Based on the piece of set value data 7 thus selected on the operation panel 12, the image forming apparatus 1 sets a set value of each setting item. Thus, a carrying user who has arrived at the image forming apparatus 1 can select the piece of set value data 7 to be used. By simply selecting the piece of set value data 7, a desired set value can be set. By simply selecting the piece of set value data 7, the image forming apparatus 1 can be brought into a state where a job can be immediately started.

Furthermore, the operation panel 12 accepts a switching operation for switching a piece of set value data 7 to be used.

Upon the switching operation being performed, based on a piece of set value data 7 newly selected through the switching operation, the image forming apparatus 1 sets a set value of each setting item. Thus, in a case of an erroneous selection of a piece of set value data 7, switching to a correct piece of set value data 7 can be easily performed. A desired piece of set value data 7 can be easily selected.

Furthermore, the operation panel 12 displays a set value set based on the selected piece of set value data 7. Set values set based on the set value data 7 can be checked.

Furthermore, the portable communication device 2 recognizes a wireless device, as the wireless device 4, that has newly become communicable therewith as a carrying user moves. The portable communication device 2 communicates with the wireless device 4 that has newly become communicable therewith. The portable communication device 2 acquires a piece of identification information for identifying the wireless device 4. Data composed of pieces of identification information that are arranged in order of acquisition is stored as the movement history data 5. Thus, it is possible to show a movement route (a behavior pattern) of the carrying user based on how the recorded pieces of identification information are arranged.

Furthermore, the portable communication device 2 includes the storage unit (the information storage unit 21), the wireless communication unit 28, and the processing unit 20. The information storage unit 21 stores the setting information 6 and the movement history data 5 indicating a history of movement of a carrying user carrying the portable communication device 2. The wireless communication unit 28 wirelessly communicates with the image forming apparatus 1. The setting information 6 is data that is a combination of the route data 8 and the set value data 7. The route data 8 indicates a movement route taken, when the carrying user executes a job on the image forming apparatus 1, by the carrying user until arrival at the image forming apparatus 1. The set value data 7 indicates a set value of each setting item used in a job. When the carrying user has approached the image forming apparatus 1 and thus the processing unit 20 has entered a communicable area where communication with the image forming apparatus 1 is enabled, based on the movement history data 5, the processing unit 20 checks the present route information indicating a movement route taken by the carrying user until entry into the communicable area. The processing unit 20 extracts, from the setting information 6 stored, a piece of setting information 6 in which the route data 8 is identical to the present route information. The processing unit 20 causes the wireless communication unit 28 to transmit, to the image forming apparatus 1, the set value data 7 included in the piece of setting information 6 thus extracted. The processing unit 20 causes the image forming apparatus 1 to set the set value of each setting item based on the set value data 7. Thus, a set value corresponding to a movement route (a behavior pattern) of the carrying user can be automatically transmitted to the image forming apparatus 1. A piece of setting information 6 is automatically extracted, and based on the set value data 7 included in the piece of setting information 6 thus extracted, settings can be automatically made with respect to the image forming apparatus 1. A set value to be set on the image forming apparatus 1 can be automatically set so as to increase the probability of being able to start a job without performing a setting operation.

What is claimed is:

1. An image forming apparatus, comprising:
a communication unit that communicates with a portable communication device;
a storage unit that stores present set value information and setting information; and
a control unit that performs control so that a job is performed based on the present set value information, wherein
the present set value information is data indicating a set value of each setting item presently set for a job about to be executed,
the setting information includes set value data and route data,
the set value data indicates a set value of each setting item for a job that has been executed,
when communication with the portable communication device has been enabled, the communication unit acquires present route information based on movement history data from the portable communication device,
the movement history data is data that indicates a history of movement of a carrying user carrying the portable communication device and in which pieces of identification information on wireless devices that have newly become communicable are arranged in order of acquisition,
the present route information is data that indicates a movement route taken this time the a carrying user carrying the portable communication device until communication with the image forming apparatus is enabled and that is based on the movement history data, the present route information including the identification information corresponding to a predetermined number of wireless devices counted in reverse chronological order from when communication with the communication unit was enabled,
the route data is data that indicates a movement route taken until the portable communication device becomes communicable with the communication unit, and is the current route information acquired when a job corresponding to the set value data was executed,
when the communication unit has acquired the present route information, the control unit extracts, from the setting information stored in the storage unit, a piece of the setting information in which the route data is identical to the present route information thus acquired, and
the control unit controls the storage unit to update the present set value information so as to reproduce the set value defined by the set value data included in the piece of the setting information thus extracted.

2. The image forming apparatus according to claim 1, further comprising:
a camera for photographing the carrying user,
wherein when the communication unit has become communicable with the portable communication device, based on photographing data obtained through photographing, the control unit determines an article held by the carrying user,
when a plurality of pieces of the setting information have been extracted, the control unit further extracts, from primary extraction information, which is the plurality of pieces of the setting information thus extracted, a piece of the setting information corresponding to a job that is performed using the held article, and
the control unit controls the storage unit to update the present set value information so as to reproduce the set value defined by the set value data included in secondary extraction information, which is the piece of the setting information further extracted from the primary extraction information.

3. The image forming apparatus according to claim 2, further comprising:
an image reading unit that reads an original document,
wherein based on the photographing data, the control unit determines whether or not the held article is a sheet of paper, and
upon determining that the held article is a sheet of paper, the control unit extracts, from the primary extraction information, a piece of the setting information corresponding to a job using the image reading unit as the secondary extraction information.

4. The image forming apparatus according to claim 2, further comprising:
a memory interface for connecting a portable memory thereto and performing reading and writing with respect to the portable memory,
wherein based on the photographing data, the control unit determines whether or not the held article is the portable memory, and
upon determining that the held article is the portable memory, the control unit extracts, from the primary extraction information, a piece of the setting information corresponding to a job using the portable memory as the secondary extraction information.

5. The image forming apparatus according to claim 2, further comprising:
an operation panel,
wherein the operation panel includes a display panel and accepts an operation,
the control unit controls the display panel to display a selection screen,
when a plurality of pieces of the primary extraction information have been extracted and determination of the held article has failed, the selection screen is a screen for selecting, from among the plurality of pieces of the primary extraction information, a piece of the setting information to be used,
when a plurality of pieces of the secondary extraction information have been extracted, the selection screen is a screen for selecting, from among the plurality of pieces of the secondary extraction information, a piece of the setting information to be used, and
the control unit controls the storage unit to update the present set value information so as to reproduce the set value defined by the set value data included in the piece of the setting information thus selected on the selection screen.

6. The image forming apparatus according to claim 5, wherein
the control unit controls the display panel to display the set value set based on the set value data included in the piece of the setting information selected on the selection screen.

7. The image forming apparatus according to claim 5, wherein
upon execution of a job, the control unit checks whether or not the storage unit stores identical information that is a piece of the setting information in which the route data is identical to the present route information and the set value data is identical to a piece of the present set value information corresponding to the job that has been executed,
when the identical information is stored, the control unit adds a value to use frequency value assigned to the identical information,
the control unit sets an order of priority for extracted pieces of the setting information so that a higher priority is given to a piece of the setting information with a larger value of the use frequency value, and
the control unit selects, as display candidates, a plurality of pieces of the setting information in a descending order of priority, and
the control unit controls the selection screen to display contents of the set value data included in each of the plurality of pieces of the setting information thus selected as the display candidates.

8. The image forming apparatus according to claim 7, wherein
when no identical information is stored, the control unit controls the storage unit to newly store a piece of the setting information including the present route information as the route data and the present set value information as the set value data.

9. The image forming apparatus according to claim 5, wherein
the operation panel accepts a switching operation for switching a piece of the setting information to be used, and
upon the switching operation being performed, the control unit controls the storage unit to update the present set value information so as to reproduce the set value defined by the set value data included in a piece of the setting information that has been newly selected through the switching operation.

10. An image forming system comprising:
the image forming apparatus according to claim 1; and
a portable communication device that transmits the present route information to the communication unit when communication with the communication unit has been enabled.

11. An image forming system, comprising:
a portable communication device; and
an image forming apparatus,
wherein
the portable communication device stores setting information and movement history data, the movement history data being data that indicates a history of movement of a carrying user carrying the portable communication device and in which pieces of identification information on wireless devices that have newly become communicable are arranged in order of acquisition,
the setting information is data that is a combination of route data and set value data,
the set value data indicates a set value of each setting item for a job,
the portable communication device wirelessly communicates with the image forming apparatus,
when the carrying user has approached the image forming apparatus and thus the portable communication device has entered a communicable area where communication with the image forming apparatus is enabled, the portable communication device checks present route information, the present route information being data that indicates a movement route taken by the carrying user until communication with the image forming apparatus is enabled and that is based on the movement history data, the present route information including the identification information corresponding to a predetermined number of wireless devices counted in reverse chronological order from when communication with the communication unit was enabled, the portable communication device extracts, from the setting information stored therein, a piece of the setting information in which the route data is identical to the present route information, the portable communication device transmits, to the image forming apparatus, the set value data included in the piece of the setting information thus extracted, the portable communication device causes the image forming apparatus to set the set value of the each setting item based on the set value data thus transmitted, and the route data is data that indicates a movement route taken until the portable communication device becomes communicable with the communication unit, and is the current route information acquired when a job corresponding to the set value data was executed.

12. The image forming system according to claim 11, wherein when a job has been executed after reception of the set value data, the image forming apparatus transmits present set value information to the portable communication device, the present set value information is data indicating a set value of each setting item for the job that has been executed, upon reception of the present set value information, the portable communication device checks whether or not there is stored identical information that is a piece of the setting information in which the route data is identical to the present route information and the set value data is identical to the present set value information thus received, when the identical information is stored, the portable communication device adds a value to use frequency value assigned to the identical information, when communication with the image forming apparatus has been enabled, the portable communication device transmits, to the image forming apparatus, the use frequency value included in each of extracted pieces of the setting information, and based on one of pieces of the set value data that has a largest value of the use frequency value, the portable communication device causes the image forming apparatus to set the set value of the each setting item.

13. The image forming system according to claim 12, wherein when no identical information is stored, the portable communication device newly stores a piece of the setting information including the present route information as the route data and the present set value information received as the set value data.

14. The image forming system according to claim 11, wherein when a plurality of pieces of the setting information that include the route data identical to the present route information are stored, the portable communication device extracts the plurality of pieces of the setting information, the portable communication device transmits, to the image forming apparatus, the set value data included in each of the plurality of pieces of the setting information thus extracted, the image forming apparatus further comprises an operation panel, upon receipt of a plurality of pieces of the set value data, the image forming apparatus causes the operation panel to display a selection screen for selecting a piece of the set value data to be used, and based on the piece of the set value data thus selected on the operation panel, the image forming apparatus sets the set value for the each setting item.

15. The image forming system according to claim 14, wherein the operation panel displays a set value set based on the piece of the set value data selected on the selection screen.

16. The image forming system according to claim 14, wherein the operation panel accepts a switching operation for switching a piece of the set value data to be used, and upon the switching operation being performed, based on a piece of the set value data newly selected through the switching operation, the image forming apparatus sets the set value of the each setting item.

17. The image forming system according to claim 11, wherein the portable communication device recognizes a wireless device that has newly become communicable therewith as the carrying user moves, the portable communication device communicates with the wireless device that has newly become communicable therewith, the portable communication device acquires a piece of identification information for identifying the wireless device, and data composed of pieces of the identification information that are arranged in order of acquisition is stored as the movement history data.

18. A portable communication device, comprising:

an information storage unit that stores setting information and movement history data, the movement history data being data that indicates a history of movement of a carrying user carrying a portable communication device and in which pieces of identification information on wireless devices that have newly become communicable are arranged in order of acquisition;

a wireless communication unit that wirelessly communicates with an image forming apparatus; and a processing unit, wherein the setting information is data that is a combination of route data and set value data, the set value data indicates a set value of each setting item used in a job, when the carrying user has approached the image forming apparatus and thus the processing unit has entered a communicable area where communication with the image forming apparatus is enabled, the processing unit checks present route information, the present route information being data that indicates a movement route taken by the carrying user until entry into the communicable area and that is based on the movement history data, the present route information including the identification information corresponding to a predetermined number of wireless devices counted in reverse chronological order from when communication with the communication unit was enabled, the processing unit extracts, from the setting information stored, a piece of the setting information in which the route data is identical to the present route information, the processing unit causes the wireless communication unit to transmit, to the image forming apparatus, the set value data included in the piece of the setting information thus extracted, the processing unit causes the image forming apparatus to set the set value of the each setting item based on the set value data, and the route data is data that indicates a movement route taken until the portable communication device becomes communicable with the communication unit, and is the current route information acquired when a job corresponding to the set value data was executed.

* * * * *